| | | | | | | | | | | | |
|---|---|---|---|---|---|---|---|---|---|---|---|
| H1 | AA1 | H5 | AA1 | H9 | AA1 | H13 | AA1 | C | AA1 | A3-1 | AA1 |
| H1 | A2 | H5 | A2 | H9 | A2 | H13 | A2 | C | A2 | A3-1 | A2 |
| H1 | BB1 | H5 | BB1 | H9 | BB1 | H13 | BB1 | C | BB1 | A3-1 | BB1 |
| H1 | BB1 | H5 | BB1 | H9 | BB1 | H13 | BB1 | C | BB1 | A3-1 | BB1 |
| H1 | BB1 | H5 | BB1 | H9 | BB1 | H13 | BB1 | C | BB1 | A3-1 | BB1 |
| | | | | | | | | C | BB1 | | |
| H2 | AA1 | H6 | AA1 | H10 | AA1 | B | AA1 | | | A3-2 | AA1 |
| H2 | A2 | H6 | A2 | H10 | A2 | | | D | AA1 | A3-2 | A2 |
| H2 | BB1 | H6 | BB1 | H10 | BB1 | B | AA1 | D | A2 | A3-2 | BB1 |
| H2 | BB1 | H6 | BB1 | H10 | BB1 | B | A2 | D | BB1 | A3-2 | BB1 |
| H2 | BB1 | H6 | BB1 | H10 | BB1 | B | BB1 | D | BB1 | A3-2 | BB1 |
| | | | | | | B | BB1 | D | BB1 | | |
| H3 | AA1 | H7 | AA1 | H11 | AA1 | B | BB1 | D | BB1 | A3-3 | AA1 |
| H3 | A2 | H7 | A2 | H11 | A2 | B | BB1 | | | A3-3 | A2 |
| H3 | BB1 | H7 | BB1 | H11 | BB1 | B | BB1 | E | AA1 | A3-3 | BB1 |
| H3 | BB1 | H7 | BB1 | H11 | BB1 | B | BB1 | E | A2 | A3-3 | BB1 |
| H3 | BB1 | H7 | BB1 | H11 | BB1 | | | E | BB1 | A3-3 | BB1 |
| | | | | | | F | AA1 | E | BB1 | | |
| H4 | AA1 | H8 | AA1 | H12 | AA1 | F | A2 | | | GS | AA1 |
| H4 | A2 | H8 | A2 | H12 | A2 | F | BB1 | G | AA1 | GS | A2 |
| H4 | BB1 | H8 | BB1 | H12 | BB1 | F | BB1 | G | A2 | GS | BB1 |
| H4 | BB1 | H8 | BB1 | H12 | BB1 | F | BB1 | G | BB1 | | |
| H4 | BB1 | H8 | BB1 | H12 | BB1 | | | | | | |

Fig-1

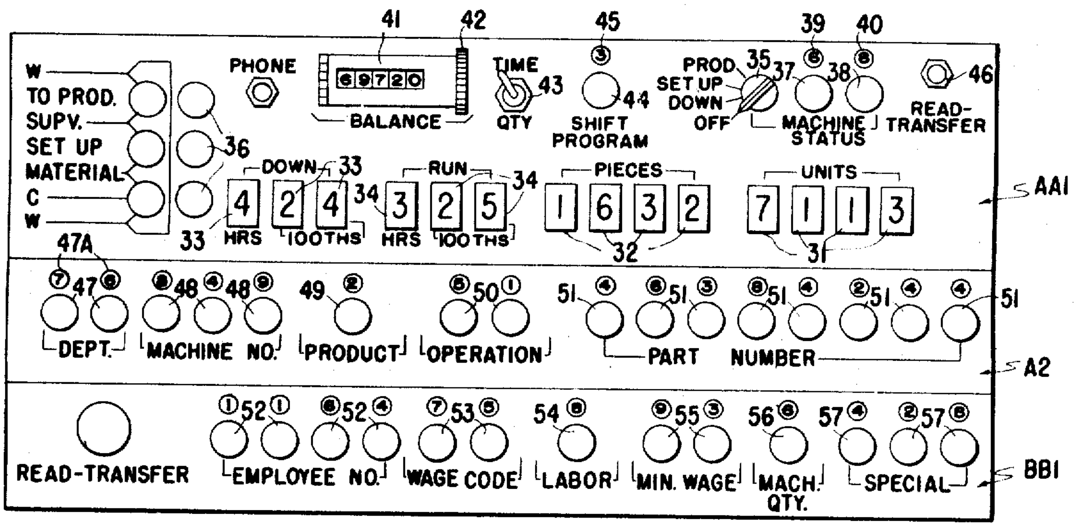

Fig-2

INVENTORS.
DONALD J. COLLOM
CHARLES G. MANN
BY
Marshall, Wilson & Yeasting
-attorneys-

| ZB RELAYS | PANELS | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| | | CARD CYCLE | | | | | | | | | | | | | | | |
| 1 | A2 | M | P | VP | VO | R | | | | | | | | | | | |
| 1 | BB1 | | | P | V | | | | | | | | | | | | |
| 2 | A2 | | Do | M | P | VP | VPO | VP | V | R | | | | | | | |
| 2 | BB1 | | | | | P | V | | | | | | | | | | |
| 2 | BB1 | | | | | | P | V | | | | | | | | | |
| 2 | BB1 | | | | | | | P | V | | | | | | | | |
| 3 | A2 | | | | | M | | | P | VP | VPO | VP | V | R | | | |
| 3 | BB1 | | | | | | | | | P | V | | | | | | |
| 3 | BB1 | | | | | | | | | | P | V | | | | | |
| 3 | BB1 | | | | | | | | | | | P | V | | | | |
| 4 | A2 | | | | | | | | | M | | | P | VP | VO | R | |
| 4 | BB1 | | | | | | | | | | | | | P | V | | |

M = MEMORIZE
P = PUNCH
V = VERIFY
R = RESET MEMORY
O = RESET REGISTERS
Do = DRY RUN OF REGISTER RESET

INVENTORS.
DONALD J. COLLOM
CHARLES G. MANN
BY Marshall, Wilson & Yeasting
attorneys

PRODUCTION MONITORING SYSTEM AND SEQUENCING CONTROL THEREFOR

Filed Aug. 21, 1964 15 Sheets-Sheet 3

INVENTORS.
DONALD J. COLLOM
CHARLES G. MANN
BY
Marshall, Wilson & Yeasting
Attorneys

INVENTORS
DONALD J. COLLOM
CHARLES G. MANN

Marshall, Wilson & Yeasting
-attorneys-

PRODUCTION MONITORING SYSTEM AND SEQUENCING CONTROL THEREFOR

Filed Aug. 21, 1964 15 Sheets-Sheet 5

INVENTORS.
DONALD J. COLLOM
CHARLES G. MANN

Marshall, Wilson & Yeasting
attorneys

INVENTORS.
DONALD J. COLLOM
CHARLES G. MANN
Marshall, Wilson & Yeasting
attorneys

INVENTORS.
DONALD J. COLLOM
CHARLES G. MANN

Marshall, Wilson & Yeasting
attorneys

INVENTORS.
DONALD J. COLLOM
CHARLES G. MANN

Marshall, Wilson & Yeasting
-attorneys-

INVENTORS.
DONALD J. COLLOM
CHARLES G. MANN
Marshall, Wilson & Yeasting
Attorneys

INVENTORS.
DONALD J. COLLOM
CHARLES G. MANN

Marshall, Wilson & Yeasting
-attorneys-

INVENTORS.
DONALD J. COLLOM
CHARLES G. MANN
Marshall, Wilson & Yeasting
-attorneys- INVENTORS.
DONALD J. COLLOM
CHARLES G. MANN
Marshall, Wilson & Yeasting
attorneys INVENTORS.
DONALD J. COLLOM
CHARLES G. MANN
Marshall, Wilson & Yeasting
attorneys INVENTORS.
DONALD J. COLLOM
CHARLES G. MANN
Marshall, Wilson & Yeasting
Attorneys INVENTORS.
DONALD J. COLLOM
CHARLES G. MANN
Marshall, Wilson & Yeasting
Attorneys United States Patent Office 3,351,912

Patented Nov. 7, 1967

3,351,912

PRODUCTION MONITORING SYSTEM AND SEQUENCING CONTROL THEREFOR

Donald J. Collom, Birmingham, and Charles G. Mann, Farmington, Mich., assignors to Weltronic Company, Southfield, Mich., a corporation of Michigan Filed Aug. 21, 1964, Ser. No. 391,102

31 Claims. (Cl. 340—172.5)

ABSTRACT OF THE DISCLOSURE

A system for reading and recording information from a number of sources which are selectively grouped for recording purposes. A programmer couples information accumulators with pre-selected and pre-set information sources. Where information is to be recorded for production and payroll control in a manufacturing plant as derived from production-information accumulators and production and employee identification pre-set sources, the system reads the accumulators then records from combinations of the read information and preset production information sources for production control, and from combinations of the read information, pre-set production information and pre-set employee information for payroll control. The programmer will simultaneously process two information source groupings by staggering and overlapping the sequential functions of reading, storing, recording, resetting the information accumulators, resetting the storing means, and verifying the recorded information. Such that, for example, one group stores information while another is recording its stored information, or one group resets its information accumulators while another group is recording.

This invention relates to apparatus for and methods of recording information.

Production monitoring techniques have become highly refined in the present technology such that it is frequently required to periodically ascertain and record a substantial number of factors concerning the work stations in a plant. For example the work periods assigned each station are programmed automatically and during each work period the production time interval, the down time interval, the number of productive operations, the code identification of the operation, the part number, the code identification of the assigned employee or employees and various other production control and payroll data is collected and must be recorded. The present invention is concerned with the recording and the verification of the recording of such date as on punch cards together with the control of the sequencing of the operations necessary to derive the data. In particular this invention is intergrated with the apparatus for reading, storing, and resetting information accumulators as disclosed in the United States patent application of Donald J. Collom and Charles G. Mann, Ser. No. 391,084 filed herewith and entitled "System For Reading, Recording and Resetting Registered Data."

The present invention is concerned with the means for expeditiously sequencing the aforenoted apparatus and applying the information stored thereby together with certain preset information into recording means. In the case of punch card recording illustrated here the sequence for a given work station involves memorizing the information accumulated in registers for that station, punching a card according to that memorized information, verifying the punched information on that card against the memorized information, resetting the registers from which the information was memorized and resetting the memorizing means.

Frequently a plant includes a plurality of work stations which can be operated on the same or different time programs. Accordingly, means for selectively memorizing and recording work stations is required according to their assigned work schedules so that one or a plurlity of work stations up to the total in the plant can be subject to a read-transfer operation in which the information recorded on registers for each station is read and then transferred to a recording medium. Further, a number of alternate work assignments can be made available at the work stations. Thus one or a plurality of employees can be monitored at a station depending upon these assignments.

In order to facilitate the maintenance of plant records it is desirable to record production information and employee information selectively. In the punch card recording system of this invention a production record card is produced for each work station and a payroll record card is produced for each employee or employee team assigned to the work station. The payroll record includes the information of the production record plus additional information pertinent to the individual employee.

Only a limited interval is available for read-transfer operations. Accordingly, the operation is expedited by avoiding the production of record cards for station and employees which are to be skipped in the program. The cards are verified while the next succeeding card is punched in those instances where succeeding cards receive the same information. Two memory banks are employed so that work station information can be memorized in one bank while that in the other bank connected to another work station is being utilized in the punch-verify sequences. The driver of the aforenoted copending patent application can thus be alternately applied to a memorizing function for one work station, then while that station is in its punch-verify sequence it is applied to another station for memory purposes, it next resets the registers in which information was accumulated for the first station. Shortly thereafter the memory associated with the first station is reset and connected to the registers for a third station so that the driver can apply the information in those registers to the memory while the information in the second memory is being employed in the punch-verify cycle for the second station. The registers of the second station are reset after a card with the information they contain has been verified. Upon completion of the punch-verify cycles utilizing the information in the second memory it is reset and the fourth station registers are read into that memory. This occurs while the third stations cards are being punched and verified. It is thus seen that an odd-even sequencing is associated with the two sets of memories in this alternate and overlapping recording.

In accordance with the above, one object of this invention is to facilitate the recording of information from a plurality of sources.

Another object is to expedite the recording operation.

A third object is to avoid unproductive recording cycles of the apparatus.

A fourth object is to verify all recorded information against the memorized information.

These objects are realized by a system which includes as a feature a pair of memory means which are employed alternately and in overlapping sequences.

Another feature is the verification of punched information against that stored in the memory set to establish the punched information.

Another feature is a sequencing means for the work stations and a similar sequencing means for the panels containing the production and employee data for each work station including means for selectively skipping stations and/or panels without consuming the usual read-transfer or record cycle intervals.

The above and additional objects and features of this invention will be appreciated more fully from the following detailed description of an illustrative embodiment of the invention in which:

FIG. 1 is a diagrammatic view of a group of panels containing information to be recorded according to this invention, those panels being grouped for twenty-three work stations and a special panel group each including a register panel and a plurality of preset panels for station, employee and production information;

FIG. 2 is a typical group of panels for a work station as represented in FIG. 1 showing in detail the type of information registered and preset thereon;

Figures 3, 5:
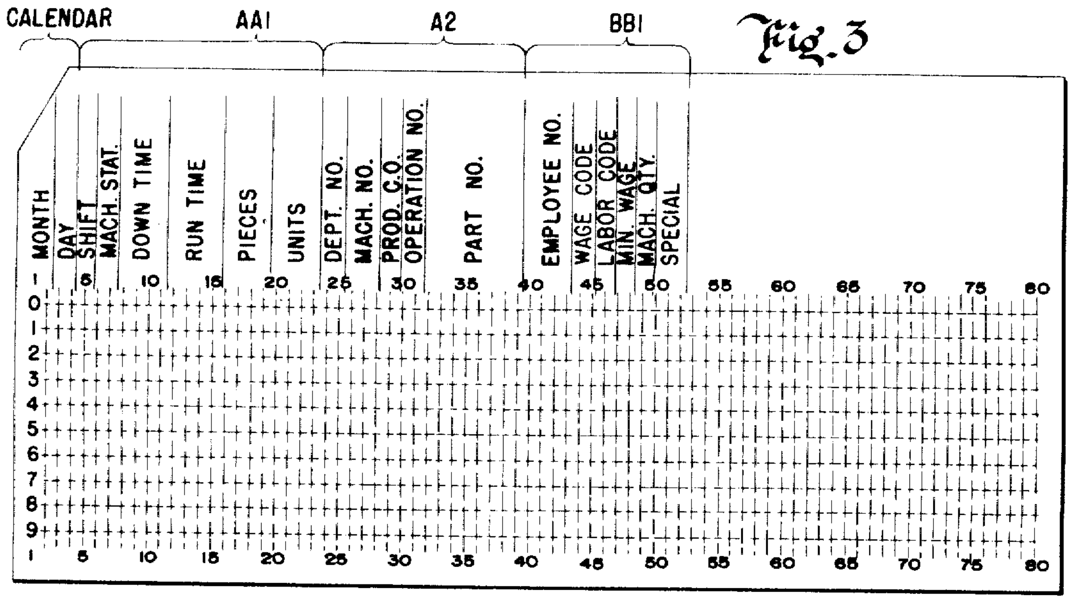
FIG. 3 is a typical punch card for recording information derived from the panels of FIGS. 1 and 2.
FIG. 5 is a sequence diagram for a system as represented in FIG. 1.

Before undertaking a detailed description of the illustrative embodiment of this invention the mode of depicting the circuits in across the line form will be described. In these diagrams relay actuating coils are shown with their control circuits and the contacts operated by the coils are not physically associated therewith in the drawings. Accordingly the relationship of the contacts to their actuating coils is set forth in a marginal index. The diagrams are divided into numbered zones or lines in the right hand margin beginning with the number 301 in FIG. 8. Each actuating coil is listed by its reference symbol in the index to the right of the line number with which it is aligned. Contacts controlled by the actuating coil are listed by the number of the line in which they appear next to the reference symbol and where shown the relay symbol is applied to the contact. In order to distinguish back contacts, those closed when the relay armature is dropped, from front contacts, those open when the relay is dropped, the back contact index position numbers are underlined.

As a further aid in reading the diagrams a list of the relays is set forth in the alphabetical order of their symbols. This includes a brief functional name for the relay and the location of its actuating coil according to the index.

| Relay Symbol | Name | Location |
|---|---|---|
| AA1 TCR1–AA1 TCR24 | Transfer Control, AA1 panels. | 521–535 |
| AA1A TCR | Transfer Control, Special AA1 panel. | 347 |
| A2 TCR1–A2 TCR24 | Transfer Control, A2 panels | 541–550 |
| A2A TCR | Transfer Control, Special A2 panel. | 348 |
| BB1 PVCR1–BB1 PVCR6 | Punch-Verify, BB1 panels | 563–573 |
| BB1 TCR1–BB1 TCR6 | Transfer Control, BB1 panels. | 581–630 |
| BB1 TCR | Transfer Control, Special BB1 panel. | 349 |
| CLCR | Calendar/Shift Punch | 357 |
| CLCR1 | First Calendar Control | 351 |
| CLCR2 | Second Calendar Control | 354 |
| EPCR | Even Punch Isolation | 355 |
| F1CR | First Flip Flop Control | 506 |
| F2CR | Second Flip Flop Control | 510 |
| F3CR | Third Flip Flop Control | 512 |
| JCR | Master Record Start | 333 |
| KCR | Sequence Initiation | 337 |
| M1CR | Odd Memory Reset | 494 |
| M2CR | Even Memory Reset | 496 |
| OPCR | Odd Punch Isolation | 352 |
| PB1–PB24 | Programmed Read-Transfer, Stations. | 305–325 |
| PB26 | Programmed Read-Transfer, Special. | 346 |
| PC1–PC24 | Programmed Read-Transfer, Stations. | 302–322 |
| PM | Master Program Clock | ---------- |
| PS–1, PS–5 | Individual Program Clock | ---------- |
| PVCRA | Odd Punch-Verify | 552 |
| PVCRB | Even Punch-Verify | 551 |
| RCR | Master Clocking | 341 |
| VCR | Zero Set | 343 |
| XA1–XA8 | Odd Punch Card Stepping Advance. | 397–431 |
| XB1–XB7 | Odd Punch Card Stepping Sequence. | 399–428 |
| XCR | Drive Start | 341 |
| XFR | Flip Flop Transfer | 508 |
| YA1–YA8 | Even Punch Card Stepping Advance. | 362–395 |
| YB1–YB7 | Even Punch Card Stepping Sequence. | 364–393 |
| ZA1–ZA26 | Work Station Stepping Advance. | 444–479 |
| ZB1–ZB26 | Work Station Stepping Sequence. | 446–481 |
| ZCR1 | Odd Driver Logic Reset | 491 |
| ZCR2 | Even Driver Logic Reset | 493 |
| ZO1–ZO4 | Zero Set Sequence | 513–516 |
| ZXCR | Punch-Verify Separation | 553 |
| 103–107 | Reset Sequence | 498–504 |

As shown in FIG. 1 the present invention has been applied to a production monitoring system for twenty-three work stations. These stations have been designated as H1 through H13, B, F, C, D, E, G, A3–1, A3–2, A3–3 and GS in the left side of the rectangles representing the individual panels in the central station for the monitoring system.

Each work station is provided with a plurality of panels from which information is read into recording equipment such as a punch card machine according to the illustrative embodiment. These panels have several functions and have been assigned classifying designations according to those functions. Each work station has at least one panel designated AA1 for accumulating production information both as to quantity and time. One work station, station B, is provided with two AA1 panels to enable monitoring at two sections of the station. Each work station has a panel designated A2 into which identifying machine and production data can be set. Each work station has at least one panel designated BB1 into which identifying employee data can be set. In the example stations H1 through H13, F, A3–1, A3–2 and A3–3 are each monitored by means of five panels comprising AA1, A2 and three BB1 panels; stations C and D each have AA1, A2 and four BB1 panels; station B has two AA1 panels, one A2 panel and six BB1 panels; station E has an AA1, an A2 and two BB1 panels and stations G and GS each have an AA1, an AA2 and a BB1 panel.

The panels as illustrated in FIG. 2 comprises a production monitoring AA1 panel including five register groups, four of which provide information for storage and recording. A work station control (not shown) includes a switch actuated mechanically, photo-electrically, or magnetically, for example, for each significant productive operation whereby units impulses are fed to solenoids driving register wheels 31 on which a count of the units produced is accumulated to form digits. A piece count is similarly accumulated on register wheels 32, for example, as some fraction of the units count or independently thereof depending upon the nature of the operation being monitored. A master clock issues impulses every hundredth of an hour and these impulses are selectively applied to the driving solenoids for down time count on register wheels 33 and productive time count on register wheels 34 as determined by the setting of selector switch 35.

A signalling means for indicating conditions at the work station, for example a switch (not shown) manually actuated by the attendant, causes illumination of signal lamps 36 singly or in combination to convey information to the central station production monitoring panel. Within the discretion of the central station attendant the assignment of the work station can be established according to the signals and supplemental information as obtained by telephone through the setting of switch 35 whereby the units and pieces register can be connected or disconnected and the time registers can be conditioned to accumulate production time intervals or down time intervals. In addition, tap switches 37 and 38 can be set to indicate the machine status according to a predetermined code as displayed in the windows 39 and 40 individual to those switches.

Balance register 41 provides a descending count from a preset value as established by setting wheel 42 for either quantity or time as determined by the setting of time-quantity switch 43. Thus register 41 can indicate the amount of time remaining of an allocated period for a run or the number of units remaining to be produced to complete a run.

A master program clock (not shown) is available to all work stations. That clock selectively enables the master timer during work intervals assigned to the work station and automatically causes the read-transfer operation according to this invention at suitable times, usually at the end of a work interval. The program setting for each work station is made on tap switch 44 and displayed at window 45. Read-transfer of information from the work station can also be instituted manually by closing read-transfer switch 46.

Complete production control information is provided by the information established in an AA1 panel and an A2 panel as shown in FIG. 2. The A2 panel comprises sixteen tap switches which can be set to coded designations for each run. Switches 47 identify the department number as displayed in windows 47A to which the operation is charged. Switches 48 are set to the machine number for producing the part. The type product is set on switch 49 and the operation is coded at switches 50. The part number comprising up to eight digits is set on switches 51.

Payroll or employment information is set on the BB1 panel for each employee, or where appropriate each team of employees assigned the work station. The BB1 panels each have thirteen tap switches for setting a four digit employee code on switches 52, a wage code on switch 53, a labor code on switch 54, a minimum wage code on switches 55, machine quantity code on switch 56, and any special code information on switches 57.

Each of the aforenoted tap switches have ten positions designated as digits 0 through 9. The registers similarly have a wheel for each decade and can be stepped to positions 0 through 9. Information for either production control or employee (payroll) records can be obtained by reading and manually recording the registers and switch settings as displayed at the windows corresponding to each switch.

In accordance with this invention the information is recorded by punching cards of the form depicted in FIG. 3. Two forms of cards are produced. A production control card suitable for ascertaining work station efficiency, inventory control and the like is produced from the production monitoring panel AA1 and the production identification panel A2. A payroll or employee record is afforded by the information available from the production monitoring panel AA1, the production identification panel A2, and an employee identification panel BB1.

As illustrated in FIG. 3 a commercially available punch card having a two coordinate array made up of eighty vertical columns each containing ten digit positions in vertical alignment in the order zero, one through nine is employed as the recording medium. Production control cards are produced by punching columns 1 through 39. The first four columns represent two "month" digits and two "day" digits obtained from calendar controls. The fifth through twenty-third columns record information from production monitoring panel AA1 as "shift" in column five, "machine status" in columns six and seven (derived from the setting of switches 37 and 38), "down time" in columns nine, ten and eleven (from registers 33), "run time" in columns thirteen, fourteen and fifteen (from registers 34), "pieces count" in columns sixteen through nineteen (from registers 32), and "units count" in columns twenty through twenty-three (from registers 31). The production identification panel A2 information is recorded in columns twenty-four through thirty-nine of the card as "department number" in columns twenty-four and twenty-five (from switches 47), "machine number" in columns twenty-six through twenty-eight (from switches 48), "product identification" in column twenty-nine (from switch 49), "operation number" in columns thirty and thirty-one (from switches 50), and "part number" in columns thirty-two through thirty-nine (from switches 51).

The employee or payroll cards contain all of the information of the production control cards plus the individual employee or employee team information as set up on the switches of the appropriate BB1 panel. Columns one through thirty-nine of an employee card are punched as set forth above. The employee information is recorded in columns forty through fifty-two as "employee number" in columns forty through forty-three (from switches 52), "wage code" in columns forty-four and forty-five (from switches 53), "labor code" in column forty-six (from switch 54), "minimum wage code" in columns forty-seven and forty-eight (from switches 55), "machine quantity code" in column forty-nine (from switch 56), and three "special" digit columns for supplemental coding in columns fifty through fifty-two (from switches 57).

The remaining columns on the card, columns fifty-three through eighty are available for recording information supplemental to that to be considered here.

In practice a read-transfer operation involves reading the information on the digit registers of panel AA1 and that set into switches on panels AA1 and A2 and, when appropriate BB1 and causing that information to be punched into one or more cards of the type shown in FIG. 3. Ordinarily not all work stations will be operated on the same time program and some employee panels for work stations which are operating will be ineffective. Accordingly, the system is arranged to expeditiously scan and skip those work stations in the scanning sequence which are not to be subject to a read-transfer operation during the program currently under consideration and those panels for each work station are similarly scanned and skipped when it is desired to avoid punching a card as where the employee for a given BB1 panel is not assigned to the station.

Automatic control of the system is afforded by a master program clock which at predetermined instants of the time institutes a searching operation for a work station assigned to the time program under consideration. Several time programs are simultaneously available from the master program clock. In the example five programs are illustrated. Each work station can be assigned to any one of these programs by means of selector switch 44 on its AA1 panel. If all work stations illustrated in FIG. 1 and all panels for those work stations are set to the same program ninety-four cards must be produced in the allotted read-transfer interval. Since this interval is usually brief, as between work shifts, it is essential that the read-transfer be accomplished expeditiously.

The present sequencing system is employed with apparatus for reading the registers of panel AA1 as a digital count and converting that digital count to a binary memory which is employed to establish a digital readout to a card punch machine emitter or other recording device. The recorded information is then verified against the memory settings and when a verification signal is issued the registers are reset by pulsing them to zero according to pulse trains established by the memory values. If those registers are properly reset, the memory and readout are verified and the system operation proceeds, if not, the system is locked up and an indicator is actuated. Much of the above equipment is described in the copending United States patent application Ser. No. 391,084 filed herewith for "Systems for Reading, Recording and Resetting Registered Data" in the names of Donald J. Collom and Charles G. Mann.

Figure 4:
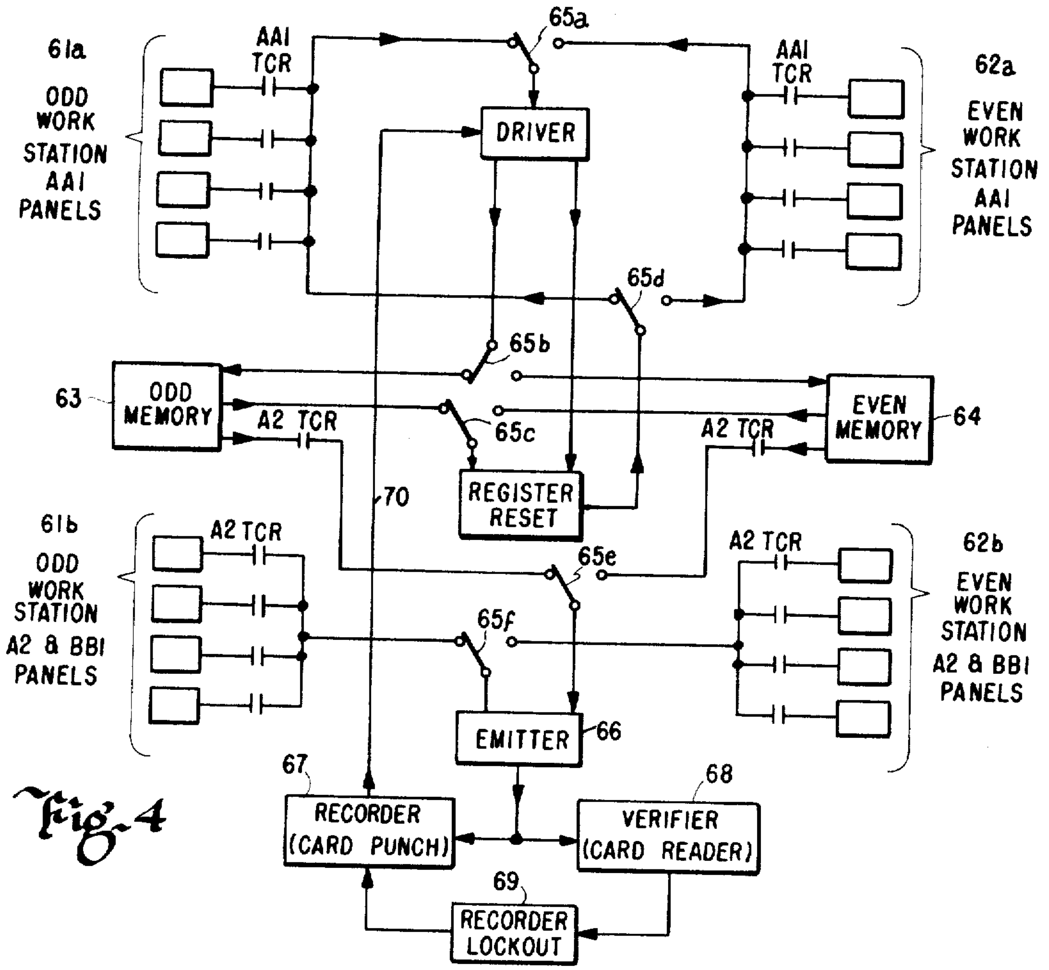
FIG. 4 is a block diagram illustrating the functions of the invention.

In order to expedite the read-transfer, the system is provided with two memories 63 and 64 as shown in FIG. 4 and has the work stations divided into an "odd" and "even" group whereby information previously stored in one memory can be employed in the card punch operation and verification of punched cards for one work station while the information from another work station in the opposite group is being stored. The various sequencing controls of this invention are arranged to enable such overlap and to accommodate it with respect to the skipping of work stations, the skipping of panels, the verification of cards, the reset of registers, the verification of memories and the reset of memories.

FIG. 4 depicts a block diagram of the system. A plurality of "odd" and "even" work station AA1 recording panel groups 61*a* and 62*a* are represented in an array with a selecting means represented as individual transfer control relay contacts AA1TCR. The AA1 panels include digit registers which set up memory circuits 63 and 64 in the odd-even sequence mentioned above. If an odd work station is subject to read transfer, odd-even controls represented by switches 65*a*, 65*b*, 65*c*, 65*d*, 65*e* and 65*f* are as shown. The driver applies a pulse train to the registers of 61*a* through 65*a* and contact TCR for the station so that memory 63 is set by a signal applied through 65*b*. With the memory set according to the reading of the registers, it issues a signal through 65*e* to emitter 66 which causes the recorder 67 to operate. Information in the BB1 and A2 panels 61*b* and 62*b* of the work station being read is set on tap switches which are connected directly to the emitter by means of transfer control relay contacts A2 TCR and subject to the control represented by odd-even selector 65*f*. In the case of a punch card machine type recorder the card is advanced after it is punched to a vertifier 68 in the form of a card reader. If the punched card reads in accordance with the input signals from emitter 66, operation continues without incident. If a disparity between the emitter 66 signal and the verifier 68 signal exists the recorder is stopped by recorder lockout 69. With the verification of the card and the continuation of operation of the recorder during the final portion of its card cycle it issues a reset actuating signal on lead 70 to the driver. The driver issues a series of pulses to the register reset and only certain of those pulses are effective on the various registers of the AA1 panel as determined by the setting of the memory 63 or 64 and the odd-even control 65*c* from the memory to the register reset. The signal pulses from the register reset are passed through odd-even control 65*d* to the registers in the AA1 panel to drive those registers in step-by-step fashion to their reset values. If all registers are properly reset the memory is then reset and conditioned to receive information from the next effective work station of its group.

*General operation*

In the above general description referring to FIG. 4 symbolic representations have been employed to simplify the system concepts. In actual practice a number of sequences are interrelated to effect the coupling and decoupling of the information sources, the driver, the card punch machine used as a recorder, and the card reader used as a verifier of the recorded information. Accordingly, the odd-even switches 65 are only symbolic of those coupling means and a number of relay contacts and sequences must be considered in the detailed description which follows to accomplish those transfer results. The transfer-control relay contacts shown in FIG. 4 are also only symbolic. As will be noted below, for example, transfer control relays for the information in BB1 panels are employed as adjuncts to the transfer control relays A2TCR in coupling BB1 panels to the punch and verify equipment.

Clocking of the sequences is based upon the operation of the recording device, the card punch machine. That clocking is accomplished as the completion of a card cycle is approached by briefly opening a normally closed circuit so that as each cycle is terminated the circuit is opened and is then reestablished immediately prior to the initiation of the next cycle. In the specific card punch employed each card cycle comprises ten punch cycles, one for each of the values zero through nine. During each punch cycle all digits of that value are punched by energizing their punch solenoids and following withdrawal of the punches the card is advanced to place its next punch position in the machine punch station or in the case of the final punch value, nine, the card is advanced out of the punch section and a new card introduced. Each punch cycle for the value nine involves a cam rotation which opens the clocking contact for one half cycle between the second and seventh tenth of that cycle, i.e. between cycle 9.2 and cycle 9.7. It is this operation that sequences the system.

Once a read-transfer is initiated the card punch issues two blank cards and then punched cards according to the programming of the system. The first card cycle sets up the proper sequencing of the equipment such that during the second card cycle the first programmed odd work station registers are coupled to the driver and the odd memory and the driver is actuated to a read cycle. The drop of relay X–CR at Q41 of FIG. 9 initiates the driver read pulse train. The driver pulses the registers with ten pulses to advance each through a cycle and a marker signal is issued from the registers as each reaches its nine value to set the memory relay matrix in accordance with a complement in digital form of the count in the register. These matrices establish paths from a plurality of pulse sources derived from the driver to admit the number of pulses required to advance the register to its zero position and establish a path for one digit value representative of that in the register to the cardpunch emitter.

In the chart of FIG. 5 the card cycle in which the second blank card is issued by the card punch is designated the zero cycle. The remainder of this general discussion will refer to the chart and will designate card cycles according to the chart numbering system so that the first productive card cycle, cycle "1" of the chart, is in fact the cycle in which the third card is advanced through the card punch. Operating intervals in this chart are numbered 0 through 15 across its top. The operations performed in each card cycle are listed in vertical columns of the table as M for setting a memory, P for punching a card, V for verifying a card, R for resetting a memory, O for resetting registers of a work station AA1 panel, and $D_0$ for a dry run of resetting a register group. The horizontal lines in the table represent the sequences to be followed in producing a card from a given combination of panels as information sources. In the extreme left column the relay selecting the work station is listed.

The column to the right of that containing the selection relay designation identifies the nature of the card being processed as A2 for a production control card including information from panels AA1 and A2, and BB1 for an employee card including information from panels AA1, A2 and BB1. In initiating a read-transfer operation assumed for illustration wherein the information for work stations GS, H1, H2 and H3 is to be recorded with only one BB1 card for panel GS, and three BB1 cards for each of panels H1 and H2 and only one BB1 for H3, the initial operation is the reading and transposing the digital count in the registers of the AA1 panel for work station GS into a binary code memorized in odd memory 63.

Figure 13:
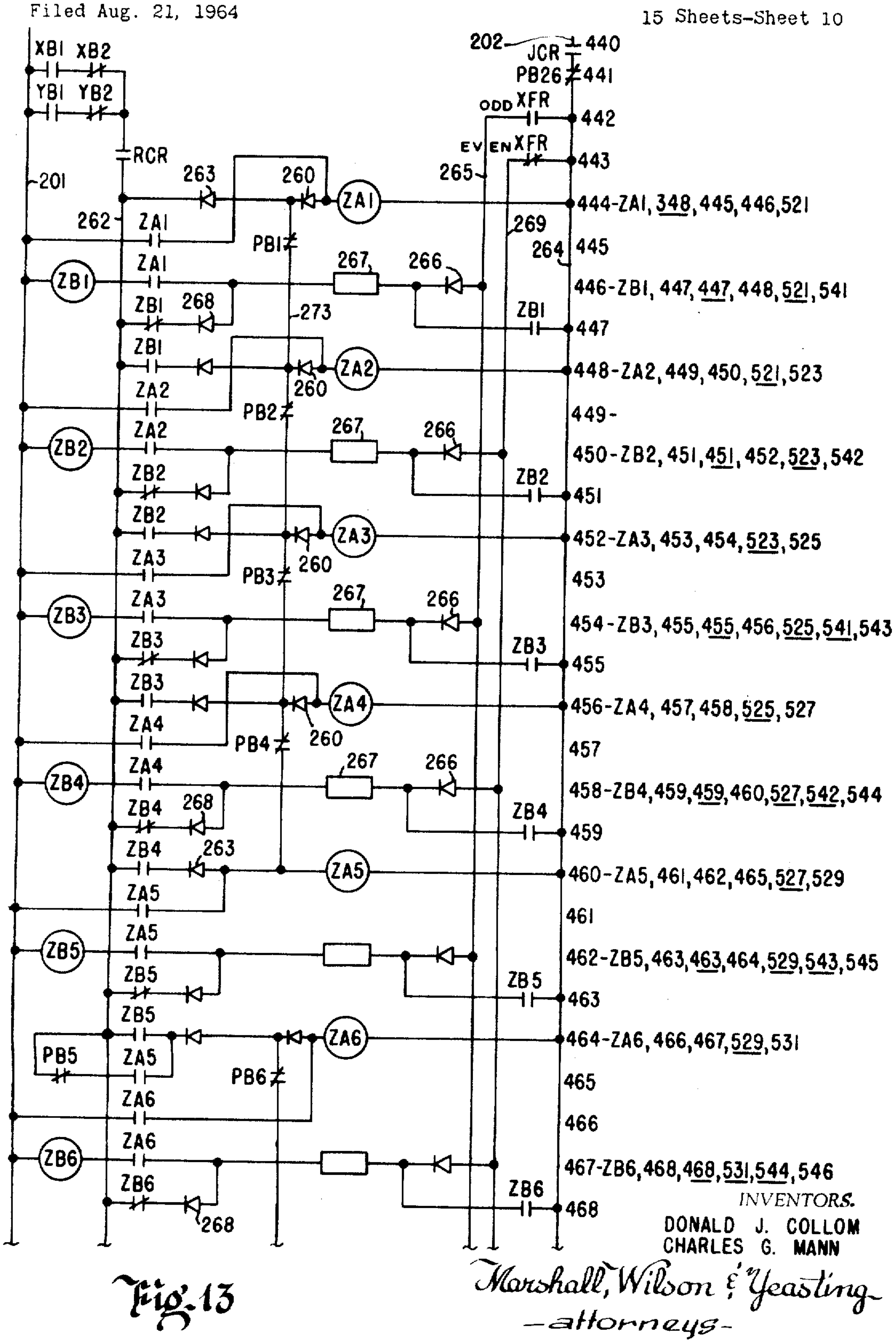
FIG. 13 and FIG. 14 are across the line diagrams of fragments of the work station stepping sequence controls.
Figure 14:
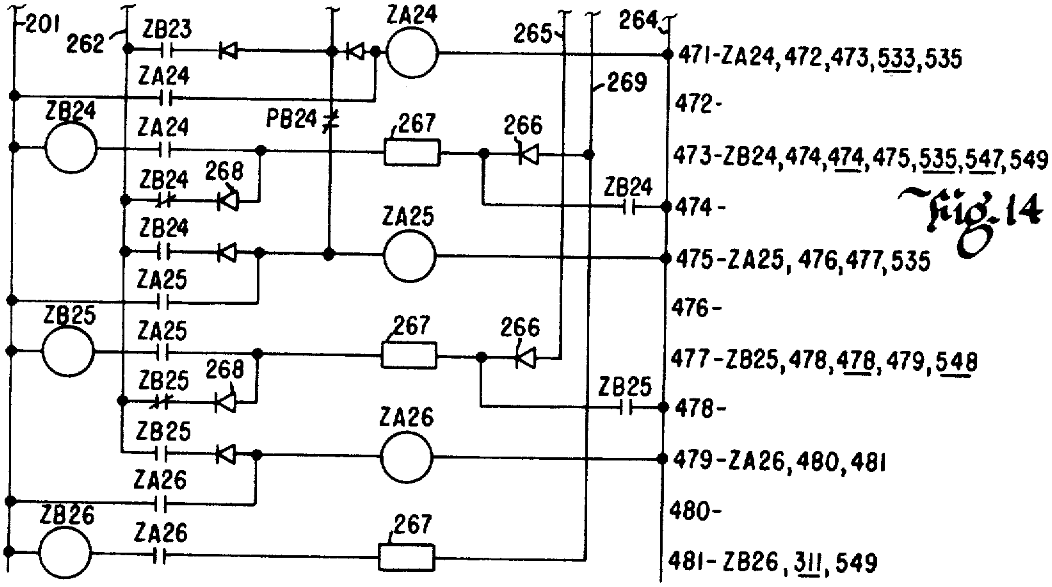
Figure 17:
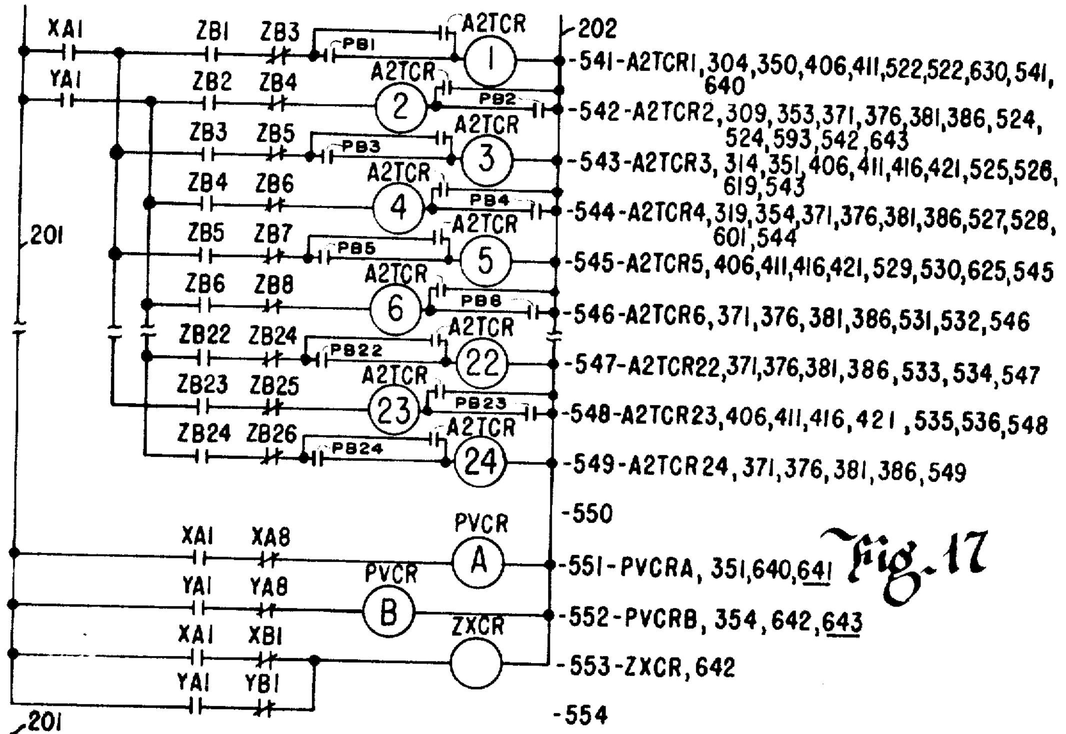
FIG. 17 is an across the line diagram of the transfer controls and punch-verify controls for the A2 panels of FIGS. 1 and 2.

Following the setting of the odd memory, the information in that memory together with that in the tap switches of panels AA1 and A2 is connected to the card punch emitter 66 through transfer control relay A2TCR of FIG. 17 under the influence of the work station stepping sequence of FIGS. 13 and 14 as represented in FIG. 4 by odd-even switching means 65e coupling emitter 66 to memory 63 through contact A2TCR and by odd-even switching means 65f coupling panel A2 through contact A2TCR. During this card cycle the card is punched.

Once the successive read-transfer sequences are initiated, the reading of information into one memory is followed by the reset of the registers associated with the other memory whereby that memory is conditioned to read a new set of registers in the following card cycle. The reset involves actuating the driver to issue a train of pulses by dropping relay VCR at 343 in FIG. 9 and selectively applying through the AA1 panel transfer control relay for that station, shown in FIG. 16, pulses from that train, as established by the memory for each register, to the respective registers to drive those registers from their read positions to their reset positions, zero in the example. Thus, during the first productive card cycle the drive is actuated to issue a reset pulse train as indicated at $D_0$ in the third line of the chart. Since the even memory is not associated with an even work station at this time no AA1TCR relay for the even stations is energized in FIG. 16, thus reset train has no effect.

At the end of the first productive card cycle the first punched card is advanced to the card reader for verification against its information sources; the memories and tap switches for the odd AA1 and A2 panels, another card is punched, in this instance with information from the same information sources and the tap switches of a BB1 panel for the station; and the memories for the even work stations are set by reading the registers of the AA1 panel of the next programed even work station.

Figure 7:
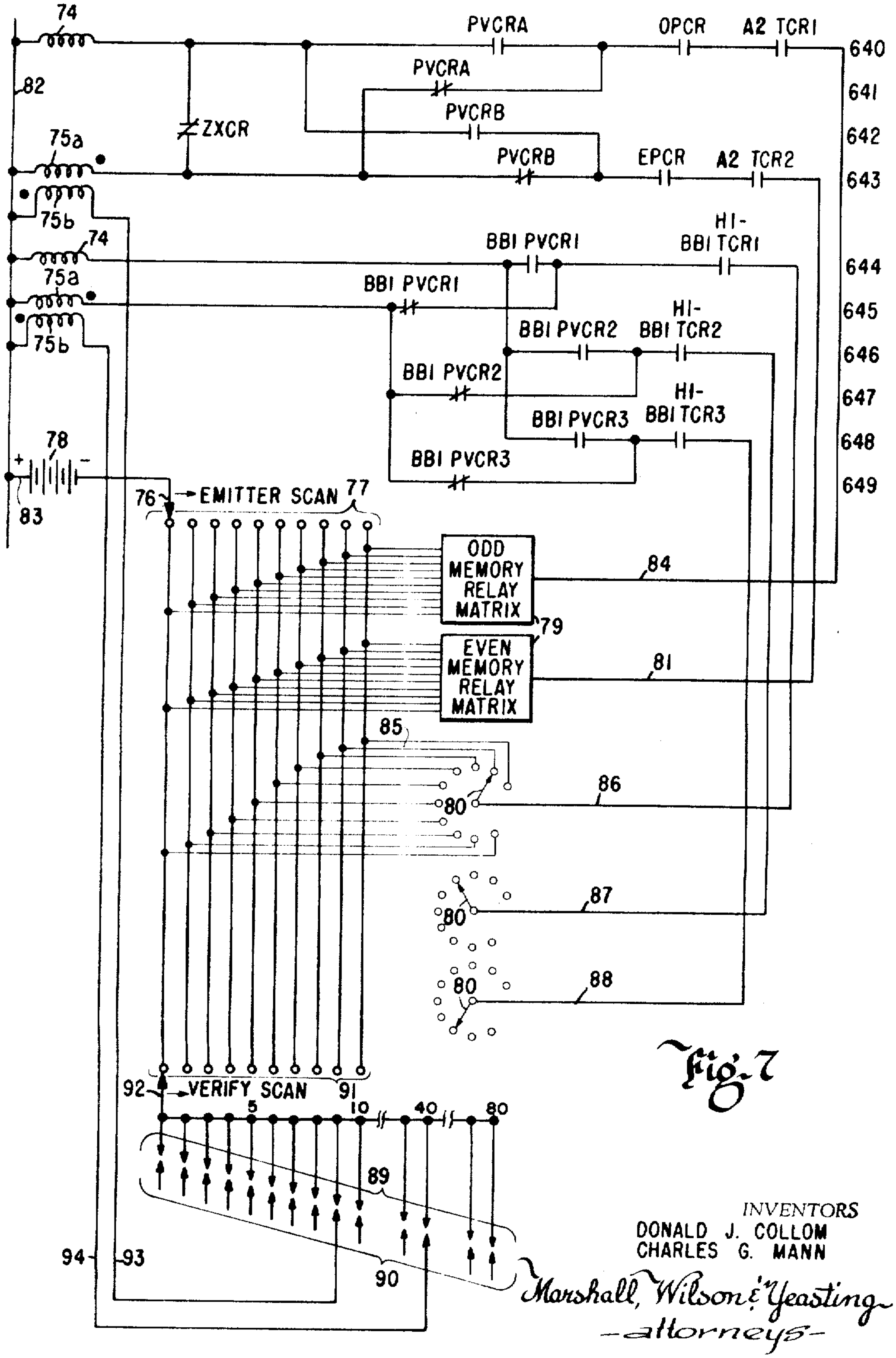
FIG. 7 is a schematic diagram of a typical punch-verify circuit according to this invention.

The first punched card is verified against its information sources by coupling the card reader to those sources through contacts of its A2TCR and punch-verify PVCRA relays of FIG. 17 as shown in detail in FIG. 7. These relays are dependent upon the sequence established by the work station stepping sequences of FIGS. 13 and 14 and the punch card stepping sequences of FIGS. 10, 11 and 12 all synchronized by the master clocking of the card punch. Verification, represented in the chart by the V in the first line column 2, is performed by reading the punched holes in the card against the digit values in the information sources which supply the punch signals for those digits. Thus a transfer control relay of the A2 series is energized during the punching and verifying of each card to couple the information source to either the punch and/or verify means.

Figure 18:
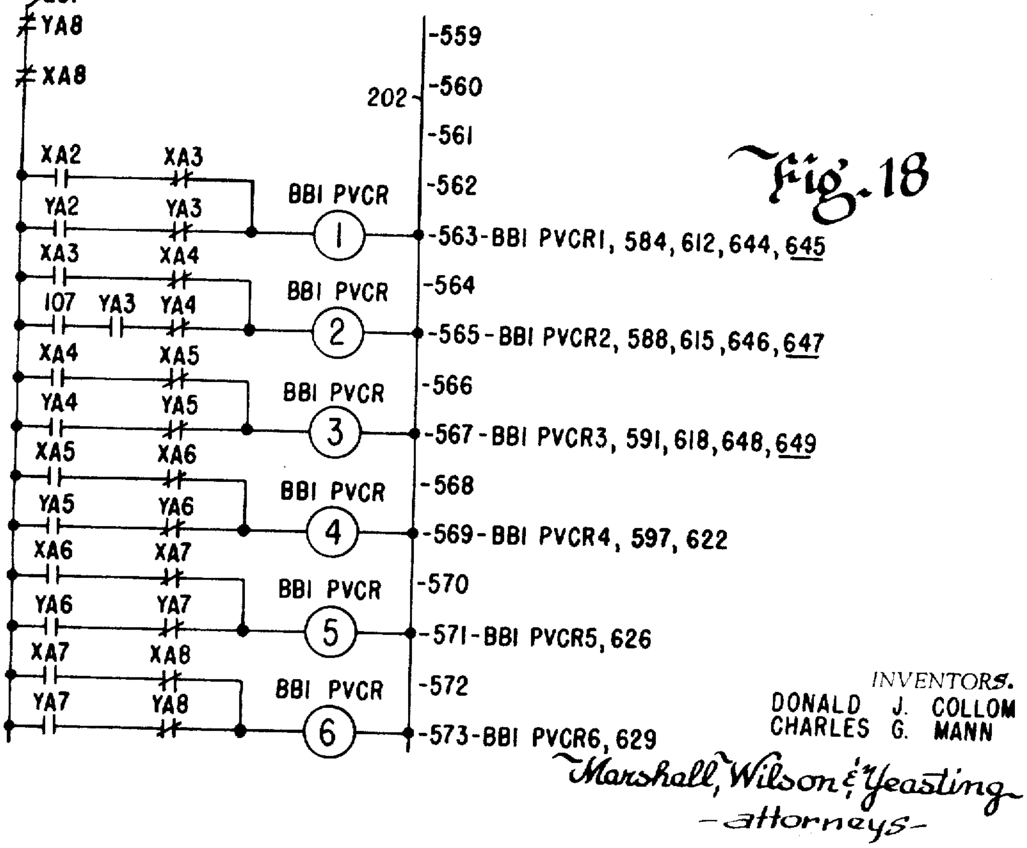
FIG. 18 is an across the line diagram of the punch-verify controls for the BB1 panels of FIGS. 1 and 2.
Figure 20:
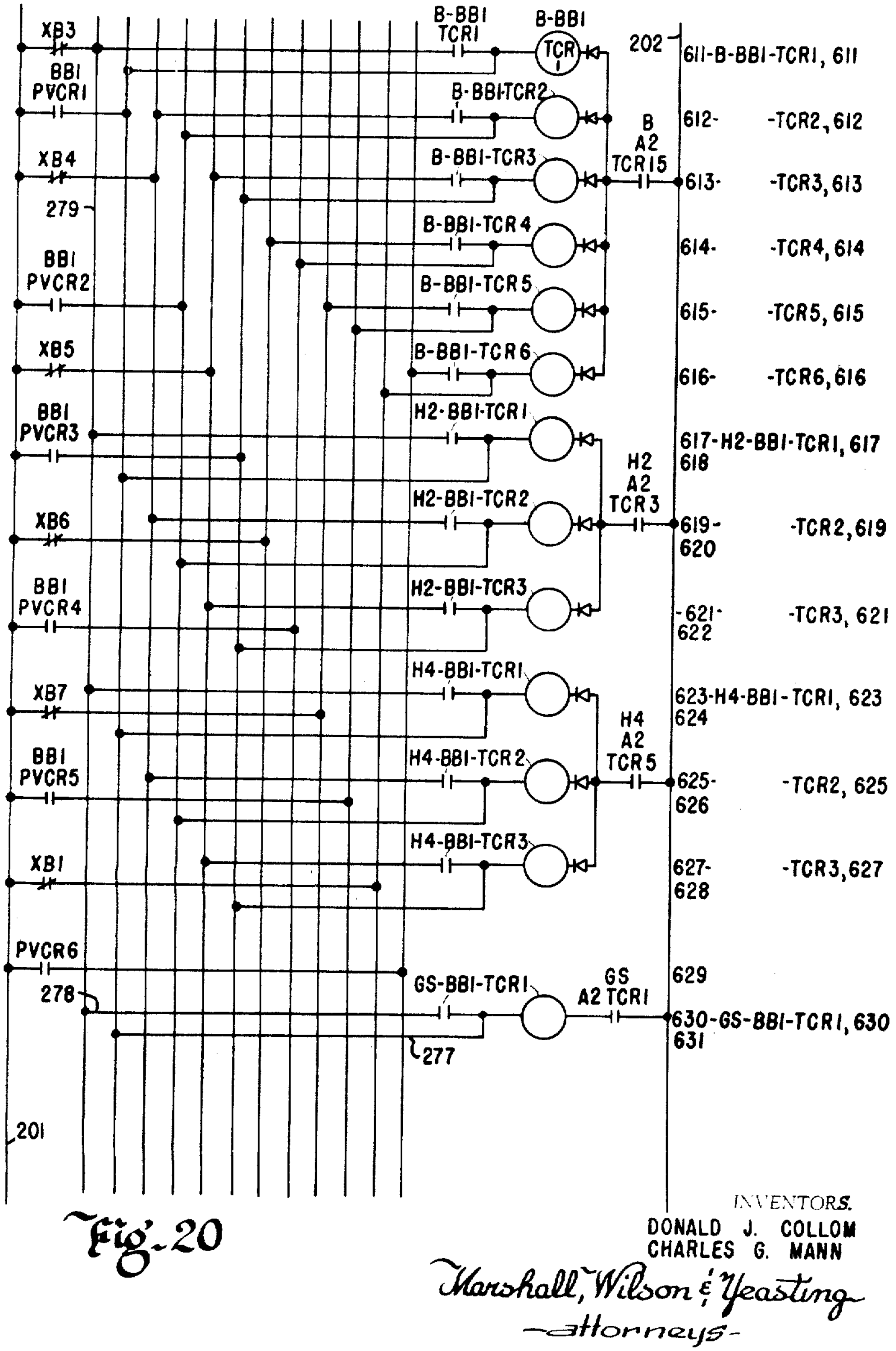

The second card to be punched is punched during verification of the first card as represented by the P's in the first and second lines of column 2. Since it is an employee card for the same work station as the first card it includes the information of the first card from the AA1 and A2 panels and that from an appropriate BB1 panel. This information is coupled to the punch solenoids by the transfer control relay of the A2 series in FIG. 17 so that portions of the same signal path from the same signal sources are utilized simultaneously to punch the second and verify the first card. The supplemental information from the BB1 panel is fed to the punch solenoids for appropriate digits by a transfer control relay and a punch-verify for that panel. The transfer control relay shown in FIG. 20, is controlled by the transfer control relay of the A2 series and by the punch card stepping sequence of FIGS. 10 and 11. The punch-verify relay shown in FIG. 18, is controlled by the punch card stepping sequence of FIGS. 10 and 11. Those connections are represented in FIG. 4 where the BB1 panel 61b is connected through a transfer control contact BB1–TCR for the panel of the selected station and odd-even switching means 65f to the emitter 66.

The memory for the next work station is set during the second productive card cycle by coupling the driver, the even memory group and the registers of the next programmed even memory group. This is represented in FIG. 5 by M at the third line column 2. The master clocking from the card punch institutes this setting of the memory and establishes the proper interconnections through operation of the punch card stepping sequence and the work station stepping sequence. The appropriate transfer control relay of the AA1 series is energized in FIG. 16 to couple the elements and the read operation of the driver is instituted by dropping relay XCR at 341.

In the third punching card cycle the second punched card is verified, the odd registers are reset, the third card is punched and since only two cards are programmed for the first work station the odd memory is reset following the verification of the last card for that work station. These functions are represented in column 3 at the first and second lines by V for verification, in the first line by O for reset of the first odd station registers, and by P in the third line for the first even station card punch. In column 4 at line 1 the memory reset is represented by an R with an arrow to the dividing line between columns 3 and 4 to indicate the reset of the memory group accomplished by opening the holding circuits for the memory relays through deenergization of relay M1CR at 494 for the odd memories and relay M2CR at 496 for the even memories. This occurs in the final portion of the card cycle in which the last card for the work station previously punched is verified.

Primary control of the functions in the third card cycle is accomplished by the card punch clocking, the punch card stepping sequence and the work station stepping sequence. Verification of the second card is accomplished through maintenance of the A2 transfer control relay for its work station the BB1 transfer control relay for its panel, the drop of its punch-verify relay PVCRA and the drop of its BB1 punch verify relay for the effective panel. These transfer control relays are dropped during the terminal portion of the card cycle in which the final card of the work station is verified.

The productive card for the next even work station is punched in the third card punching cycle by the coupling, through its A2 series transfer control relays, of its information sources for its AA1 and A2 panels to the card punch emitter. At this time that work station AA1 series transfer control relay is deenergized to avoid the coupling of the driver during the reset by the driver of he opposite group of registers. The punch operation also involves energization of the punch-verify relay PVCRB at 553. In order that the even station punch operation for its first card has its signal separated from the odd station verification for its last card the punch-verify separation relay ZXCR is energized for each card cycle in which such an overlap exists and is deenergized at all other times.

A register resetting pulse train is issued by the driver to the odd work station during the third card punching cycle, since in this case it follows the memorizing of the even work station in the preceding card cycle. The sequencing equipment enables this reset by energizing the transfer control relay of the AA1 for the odd work station previously read to couple the driver, memory established pulsing paths and the registers. It also starts a zero set pulse train in the driver by dropping relay VCR at 343.

In the fourth card cycle the second selected odd work station H2, that selected by energization of relay ZB3, has its information accumulated in its registers of its AA1 panel memorized as indicated by the M in the seventh row of FIG. 5. No cards are punched with this information until the seventh card cycle since three payroll cards are scheduled for the first even work station H1. These cards are punched in the fourth, fifth and sixth card cycles and verified in the fifth, sixth and seventh cycles respectively.

Upon verification of the second card utilizing information from a memory the registers which supplied the information to that memory are reset. Thus in the fifth card cycle the even registers are reset by the driver as signified by the 0 in the third row. The memory is retained until the last card utilizing its information is punched and verified. Thus the even memory holds its setting until the final portion of the seventh card cycle such that the third payroll card has been verified for that work station and is then reset as indicated by the R at the line separating the seventh and eighth cycles.

In the seventh cycle the odd memory is again effective, at this time with information from the second odd work station to punch a production record card shown as P in row seven. This card is verified while the first payroll card is punched during the eighth card cycle. Upon verification of this payroll card in the ninth cycle the registers of the second selected odd work station are reset by the driver.

In subsequent sequences wherein odd and even work stations are programed alternately and in an ascending order, the reset of registers for an even work station follows the first card verification for that station, the memory group for the even station is reset in the terminal portion of the cycle in which the last card for that station is verified, and the new information from the next even station is read into the reset even memory group in the next card cycle. The reading of the registers of a set for the odd group occurs in the second card cycle for the even station during the interval the first card of the even station is verified and the second card for that even station is punched.

Figure 10:
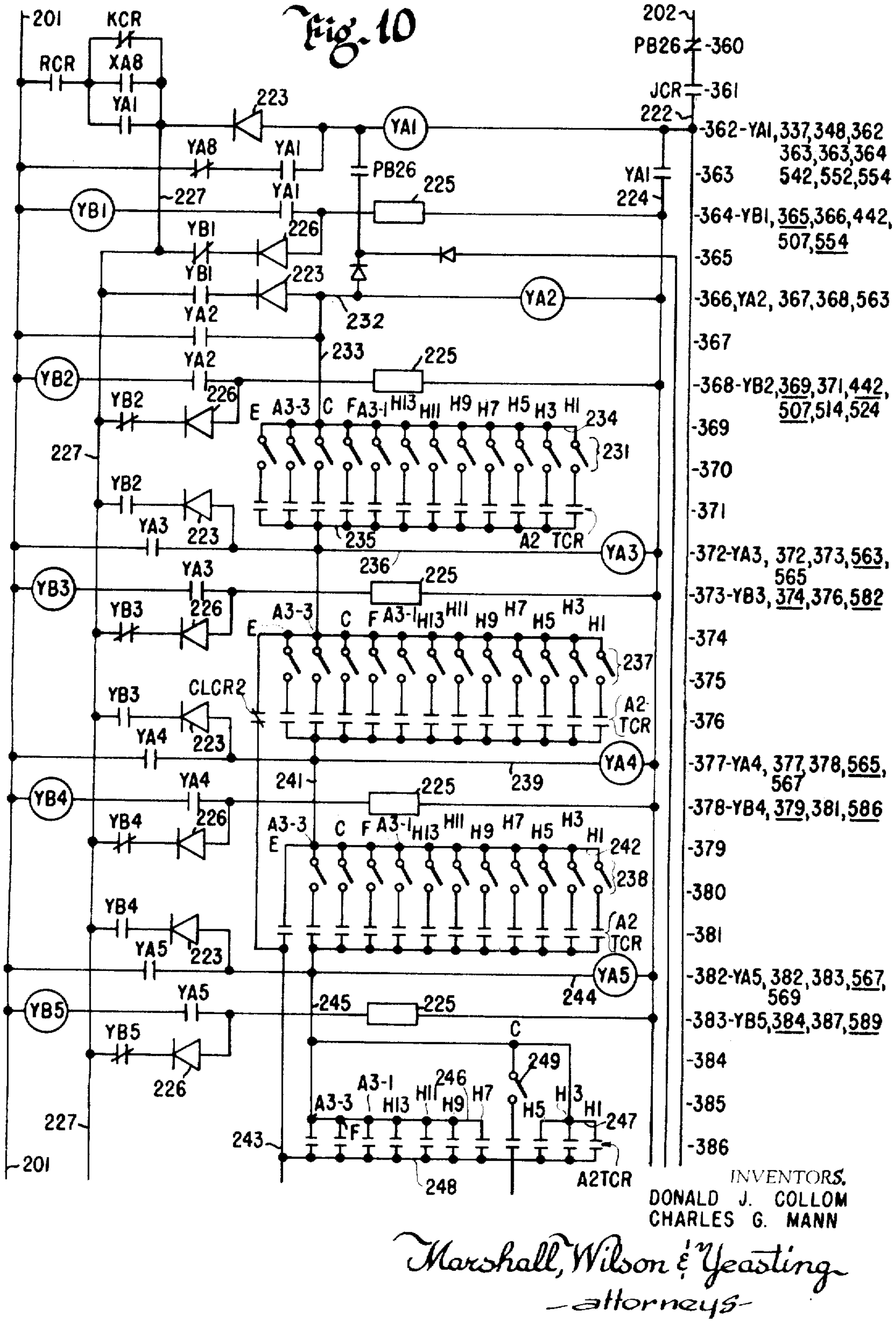
FIG. 10 is an across the line diagram of a portion of the even work station, punch card stepping sequence controls.
Figure 11:
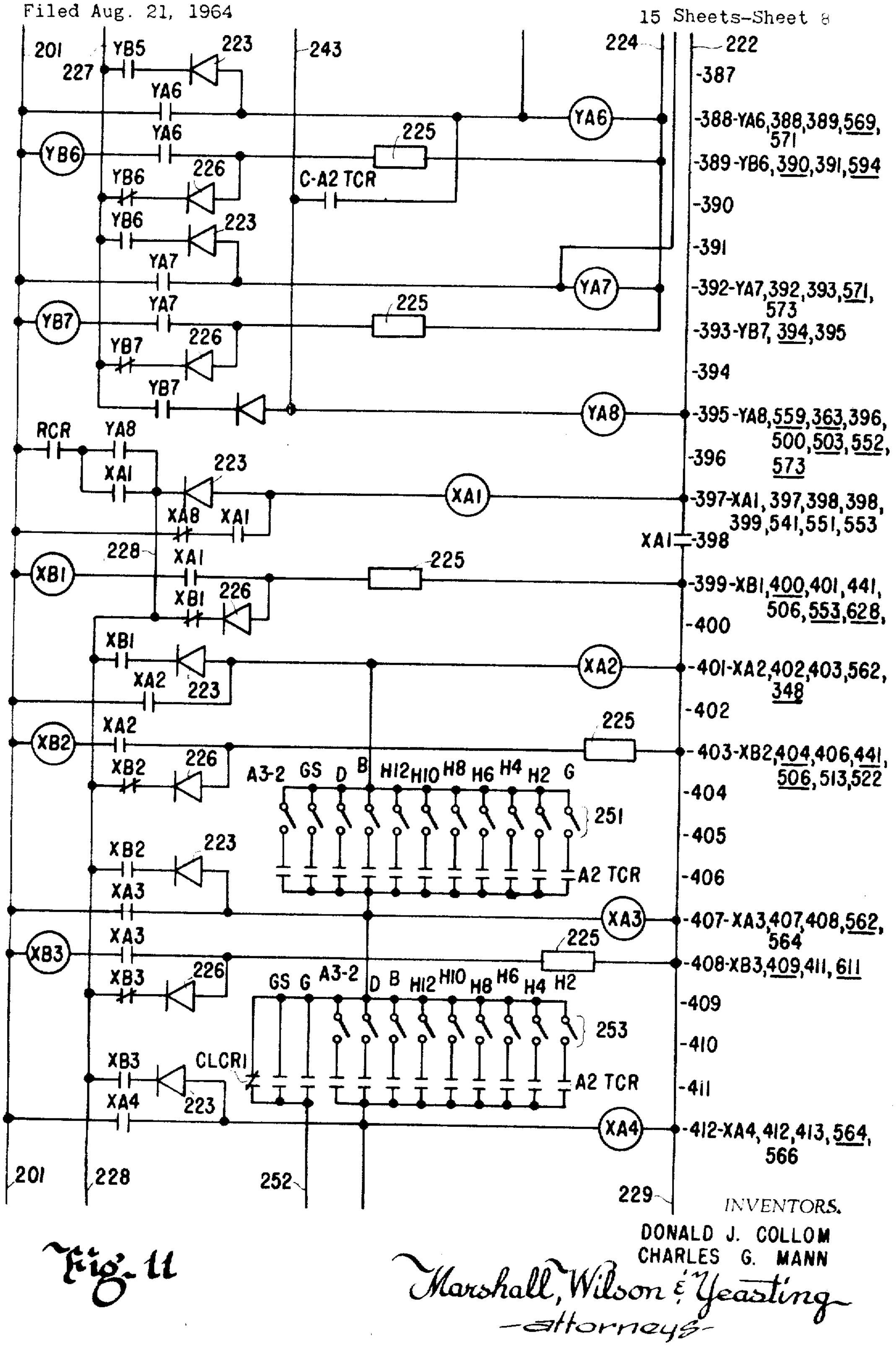
FIG. 11 is an across the line diagram of the remainder of the even work station and a portion of the odd work station, punch card stepping sequence controls.
Figure 12:
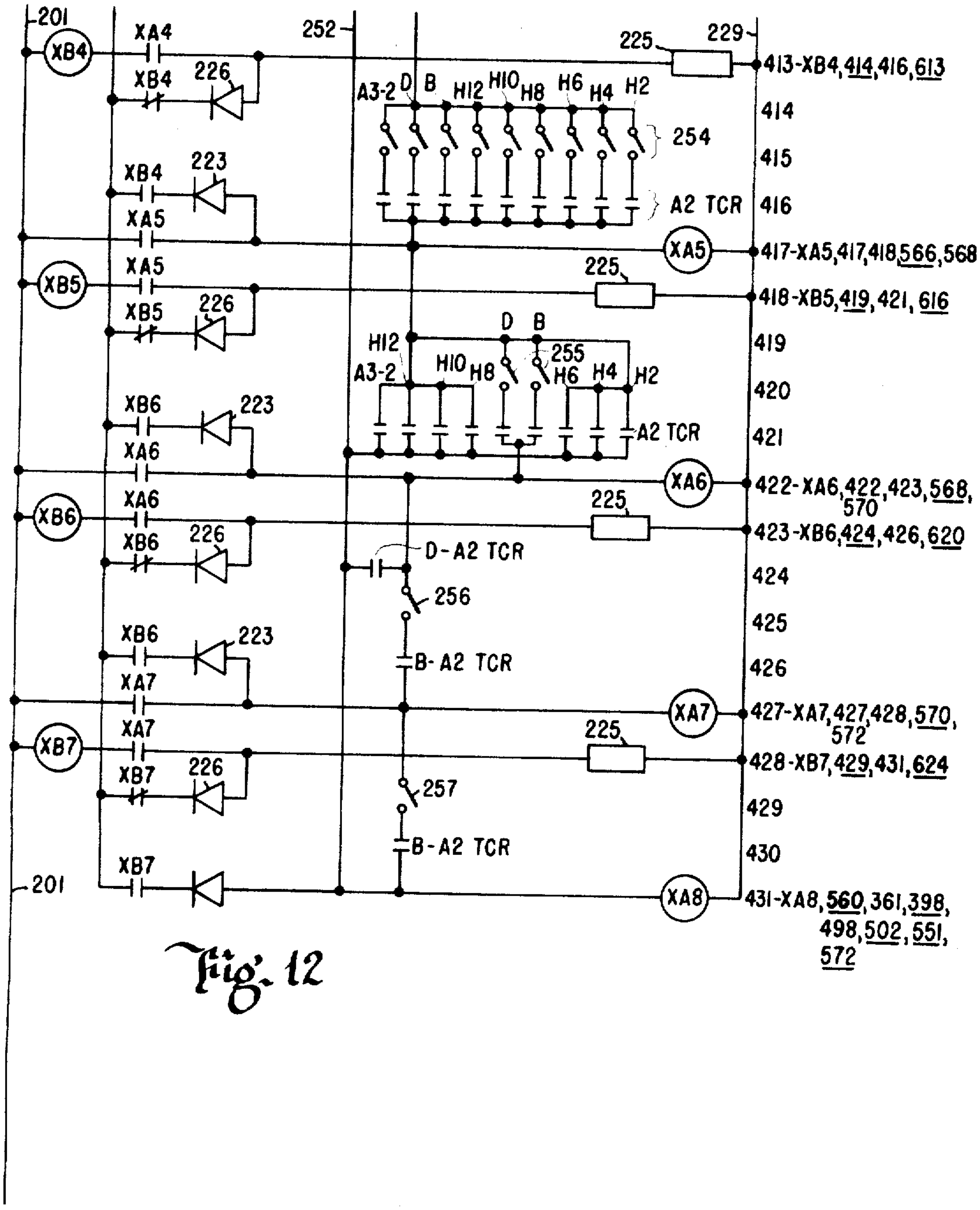
FIG. 12 is an across the line diagram of the remainder of the odd work station, punch card stepping sequence controls.

The primary control of the aforenoted sequences is the punch card stepping sequence controls of FIGS. 10, 11 and 12. These controls are divided into two groups, one for the odd work stations, including the XA and XB series of relays, and one for the even work stations, the YA and YB series of relays. The XA and YA relays are individually actuated in step by step fashion under clocking control of the card punch machine such that the highest order relay in the series defines the card cycle for punching a given card. This the first relay defines the production card punching cycle, the second the first employee card punching cycle, the third the second employee card punching cycle, etc.

The work station selection is also determined by a series of relays ZA and ZB of FIGS. 13 and 14. However the clocking of this series is dependent upon both the card punch and the punch card stepping sequence so that an advance in the work station stepping sequence occurs only once during each punch card stepping sequence. This advance occurs during the second card punching cycle of each sequence and enables the memory function for the next work station programed at that time.

The above sequences continue until all of the work stations and panels programmed for the current read-transfer operation have their information punched and all registers and memories have been reset.

*Information sources*

Two means of providing signals to the card punch emitter are utilized in the example. Tap switches are connected directly through transfer control relay contacts TCR as illustrated in FIG. 7. Registers are read into relay matrices as illustrated in FIG. 6.

Figure 6:
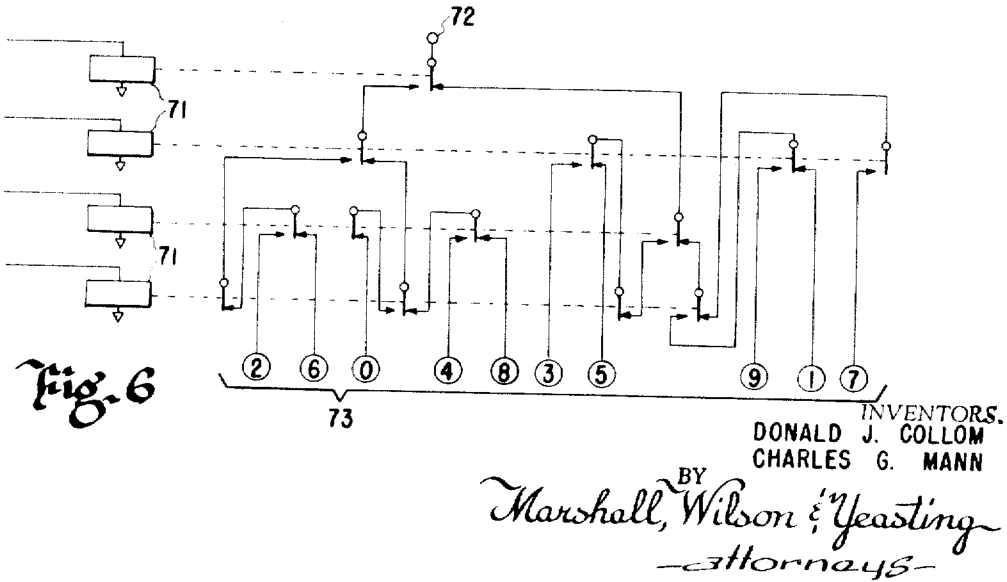
FIG. 6 is a diagram illustrating the contact array in the relay type memory employed to store information in a binary code as a decimal code.

The matrix of FIG. 6 comprises four relays 71 responsive to a binary coding of digits zero through nine as described in the application filed herewith. These relays complete a path from terminal 72 through their contact matrix to one of ten output terminals 73 to decode the binary number to a decimal zero through nine.

The application of the relay matrices of FIG. 6 to control punch magnet solenoids 74 and verification relay coils **75*a* and 75*b* is shown in FIG. 7. Only one punch magnet 74 controlled by corresponding relay matrices of the odd and even memories and one punch magnet controlled by corresponding tap switches of BB1 panels for a given work station is shown. Certain details of the operation of this circuit will be reviewed below. Its general function is to enable the emitter to apply a signal to each of the eighty punch controls. This is schematically represented by wiper contact 76 which scans contacts 77 for each of the ten digit positions in synchronism with the advance of a punch card beneath the punches so that when the zero punch position on the card is at the punch station, wiper 76 is passing a signal from source 78 to the zero contact 77. Each contact 77 is connected to a bus to which the decimal terminals of each relay matrix 79 and the contacts of each tap switch 80** are connected.

When a signal is applied to the matrix terminal or tap switch contact through which a circuit is completed to its individual output lead, that signal is conveyed to the punch magnet solenoid 74 associated with that digit. Consider the read-transfer of the first even work station H1 and that punch magnet 74 at 640 is for the ninth digit on the card representing the units digit for down time as derived from register 33 on panel AA1 of FIG. 2. This digit is stored in the even memory relay matrix for that digit. Consider further that the number three is stored. When emitter contact 76 encounters any of contacts 77 but that for the number three it has no effect on the matrix output since the signal from 78 encounters an open relay contact. When the contact 77 for the number three is closed a signal is passed to lead 81. At this time the H1 work station is coupled to solenoid 74 at 640 by transfer control relay contact A2 TCR2 at 643, even punch isolation relay contact EPCR at 643, and even punch-verify relay contact PVCRB at 642 so that the circuit is completed to lead 82, lead 83 and the positive terminal of source 78. Since the card is in its "three" punch position it is punched for the ninth digit at this time.

Had an odd work station been subjected to read-transfer the memory would have been in odd memory 79 and the signal path would follow lead 84 through contact A2 TCR1 (as for work station GS) at 640, odd punch isolation contact OPCR at 640, and punch-verify contact PVCRA at 640 to solenoid 74.

Consider the production of a first employee card for work station H1, that the tap switches 80 are for the fortieth digit (the thousand digit for the employee code as established on tap switch 52 of panel BB1 in FIG. 2), and that the first employee is coded in the eight thousand series so that his switch 80 is set on eight. When the emitter applied the signal from source 78 to contact 77 for the number eight, it is passed over lead 85 and switch 80 to lead 86 transfer control contact BB1 TCR1, punch verify-contact BB1 PVCR1 and punch magnet solenoid 74 all at 644 to punch the fortieth digit as an eight. In a similar machine when the second and third employee cards are punched solenoid 74 at 644 is energized from leads 87 and 88 through contacts BB1 TCR2 and BB1 PVCR2 at 646 and contacts BB1 TCR3 and BB1 PVCR3 at 648 respectively.

Verification of the punched card against the memory setting in the matrix or the tap switch settings is accomplished by a card reader associated with the card punch. The card reader comprises a series of opposed contacts 89 and 90, one for each of the eighty punch positions, located on the opposite faces of the card so that a circuit is made only when a punched region of the card is between the contacts. These contacts are aligned in the same relative positions as the punch magnets and the card drive of the reader (not shown) is synchronized with that of the card punch so that a first card has its three position for each digit in the reading station between contacts 89 and 90 when the following card has its three position for each digit in the punch station of the card punch.

A differential relay (not shown) in the card reader for each digit is provided with a pair of like connected coils **75*a* and 75*b* wound to produce opposing and mutually canceling fluxes. During the punch cycle for each value the preceding card is verified for that value by deenergizing the punch-verify relay to close its back contacts to coil 75*a* and pass the signal from the matrix or tap switch therethrough while the emitter also enables coil 75*b* to be energized. The energizing path for coil 75*b* is from the common buses for zero through nine of the emitter, individually fed from source 78 through contact 76. This signal is taken from the buses at a second series of contacts 91 scanned by contact 92 in synchronism with contacts 76. It is fed to the eighty reader contacts 89 and passed by those contacts engaging their counterparts 90 through punched apertures in the card to verify coils 75*b*. In the case of the ninth digit this is accomplished through the ninth set of reader contacts to lead 93 to coil 75*b* at 643 and lead 82 returning to source 78 on lead 83 to cancel the effect of the flux developed in coil 75*a* at 643 at this time. The fortieth digit is verified by the passage of the signal for the digit value from contact 92 to the fortieth set of reader contacts 89 and 90 to lead 94 and the fortieth digit verify coil 75*b* at 646, from which it is returned to source 78 over leads 82 and 83**. If no verify armature is pulled the card punch continues to operate and the next digit value or card cycle follows in regular order until the operation is completed.

*Program selection of work stations*

Figure 8:
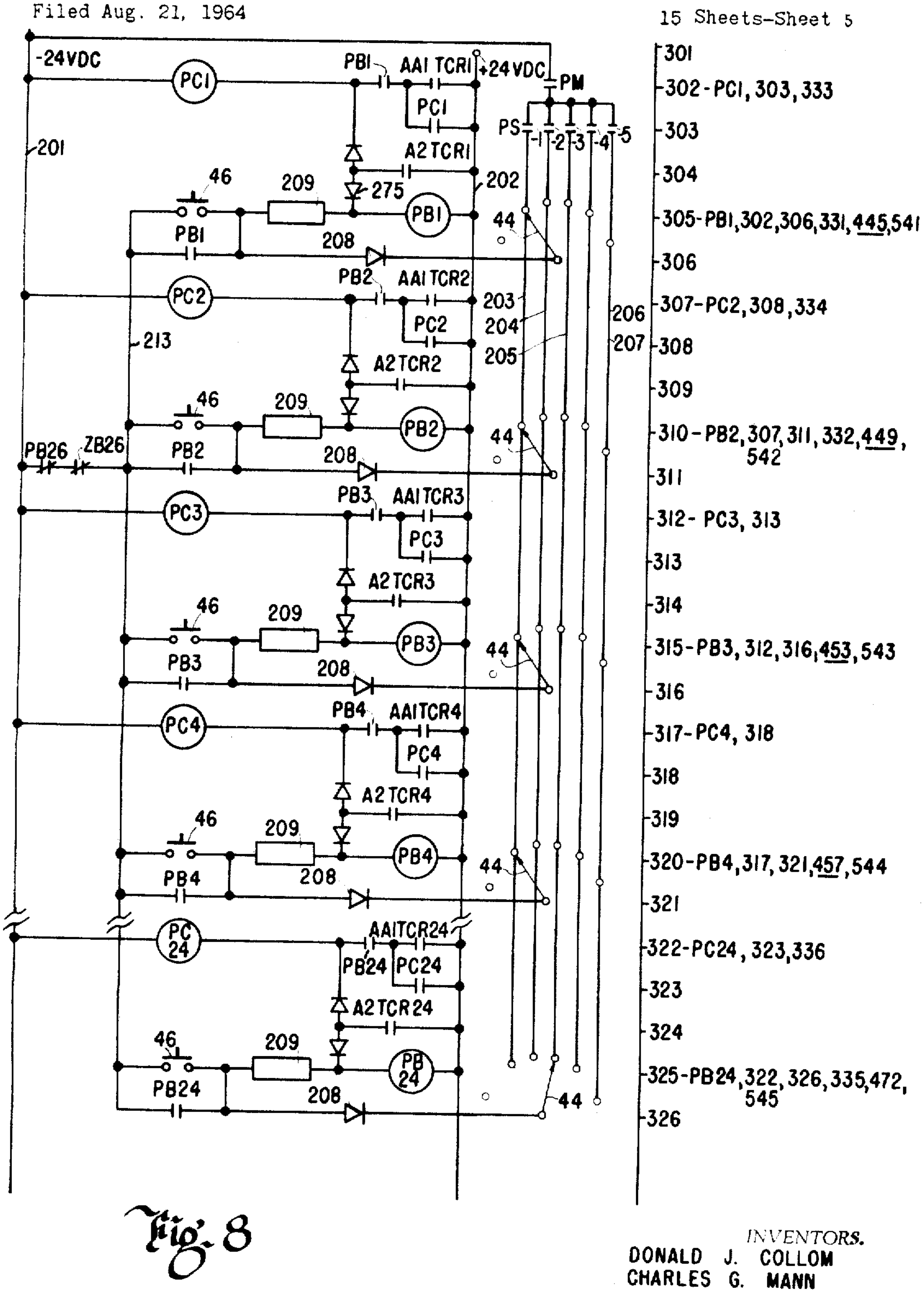
FIG. 8 is a partial diagram in across the line form of typical program control relays and the alternate manual control feature for the several work stations accessible to the read-transfer system.

Relays of the PB series illustrated in FIG. 8 establish, when energized, that their corresponding work stations will be subjected to a read transfer operation. Their principal functions are to activate the read-transfer sequences when any one of the series is energized and to skip all work stations which do not have their relay of the PB series energized. Relays of the PC series in FIG. 8 correspond to those of the PB series and function to seal certain circuits established by the PB series when the PB series has been dropped and until the verification of the last card for a station. The drop of the final PC relay terminates the read-transfer operation.

The sequencing controls of FIGS. 8 through 20 will now be considered in detail. Leads 201 and 202 are supplied from suitable direct current sources, e.g., −24 volts D.C. and +24 volts D.C. respectively. These leads supply most of the controls to be discussed. Master programmer contact PM*at* 302 is driven by a master program clock (not shown) and is closed for a suitable interval for each increment of time defined by the clock. Program selection contacts PS–1 through PS–5 inclusive at 303 are also driven by the master program clock and are closed at predetermined times as selected by the programming set into the clock. These PS contacts can be operated several times during a clock cycle and thereby employed to define the beginning and end of each work period. For example programming might be established for work periods ending at 8 a.m., 4 p.m. and 12 p.m. by energizing lead 203 through contacts PM and PS–1, while work periods ending at 7:30 a.m., 3:30 p.m. and 11:30 p.m. might be defined through contacts PM and PS–2 to energize lead 204. Similarly leads 205, 206 and 207 can be set to define program intervals by contacts PS–3, PS–4 and PS–5 and the moment and period of energization established by master programmer contact PM.

Each individual AA1 panel from which information is to be read is provided with an individual program selection switch 44 as discussed with regard to FIG. 2, which can be set to any of six positions including the "off" or O position and programs 1, 2, 3, 4 and 5. In the example the first AA1 panel is set to the first program by switch 44 connecting lead 203 through isolating diode 208 and resistor 209 to programed read-transfer relay PB1. Each AA1 panel is provided with such a circuit although FIG. 8 depicts only representative circuits for the first through fourth and the twenty-fourth AA1 panels.

Upon the pull-in of relay PB1, contact PB1 at line 331 is closed to enable master record start relay JCR at 333 to be energized from a suitable source of alternating current, e.g., 115 volts, connected across terminals 211 and 212. This relay will be energized upon the closure of any one of the individual work station program relays to close one of contacts PB1 to PB24 exemplified in part in lines 331 to 336 and a contact of special relay PB26 at line 346 (not shown). Contact PB1 at 302 is closed without effect at this time. Contact PB1 at 306 is closed to lead 213 to seal relay PB1, provided the special panel, the twenty-sixth, is not subject to a read transfer function at this time and back contact PB26 at 311 is closed. Back contact PB1 at 445 is opened to isolate relays subsequent to that for the first panel in the work station stepping sequence relay series of FIG. 13 and thereby prevent the skipping of the first panel.

In a similar manner each panel which is conditioned for the first program will be conditioned for read-transfer at this time, subject of the sequencing control to be described, by the pull in of its PB relay. As shown in FIG. 8 each of relays PB2, PB3 and PB4 for the second, third and fourth panels will be energized simultaneously for the first program. However, the twenty-fourth panel has its program switch 44 set for the third program so that it will be energized when the lead 205 is activated through contacts PM and PS–3 at 302 and 303. This may occur at the time the first program is in effect or at any other time, depending upon the clock setting for contact PS–3.

If it is desired to subject a panel to a read-transfer operation, this can be undertaken by manual operation of switch 46 of FIG. 2 at lines 305, 310, 315, 320 or 325 to pull in the PB relay for the panel.

*Start of read-transfer*

Figure 9:
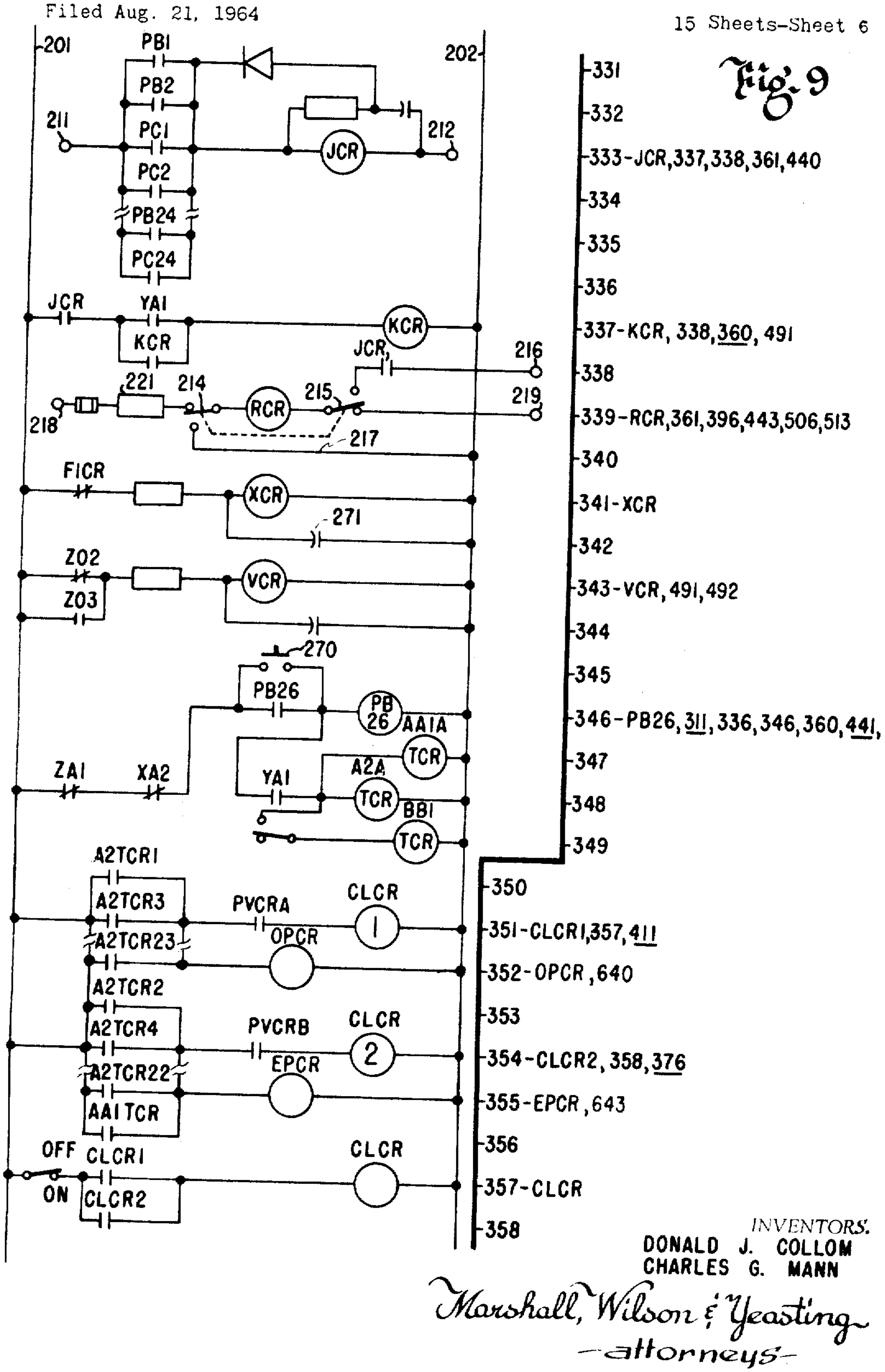
FIG. 9 is an across the line diagram of the sequencing controls for starting and resetting elements of the system, a special panel control, punch controls and calendar controls.

Master record start relay JCR at 333 of FIG. 9 starts the card punch machine by means not shown and enables the sequencing circuits and the driver (by means not shown). Sequence initiation relay KCR at 337 starts the punch card stepping sequence. Master clocking relay RCR responds to the cycling of the card punch to provide primary clocking signals to the system. Drive start relay XCR when deenergized closes a back contact in the read initiation circuit of the driver (not shown) whereby a read pulse train is generated. Zero set relay VCR at 343 when deenergized starts a zero set pulse train in the driver by closing a back contact in the start circuit therefor (not shown). Relays PB26, AA1ATCR, A2ATCR and BB1TCR are the programing and transfer control relays for a special group of panels which can be actuated only manually. Relays CLCR1, CLCR2 and CLCR at 351, 354 and 357 are calendar control relays which actuate date and shift codes for the cards being punched and verified. These relays also enter into the skipping of steps in the punch card stepping sequence to insure against the issuance of unnecessary blank cards when initiating the sequence or skipping work stations in a manner which disrupts the regular issuance of cards. Punch isolation relays OPCR and EPCR separate the memories of the even and odd station digits during the interval there is an overlap in the energization of the transfer control relays of the A2 series for those stations. This separation is illustrated in FIG. 7.

The energization of master record start relay JCR at 333 of FIG. 9 closes contact JCR at 337 and 338 to effect the sequencing and closes contact JCR at 361 to activate the main leads to the punch card stepping sequence relay series of FIGS. 10, 11 and 12, and contact JCR at 440 to the work station stepping sequence relay series of FIGS. 13 and 14. Initially the closure of contact JCR at 337 has no effect. However, upon energization of the first punch card sequence stepping relay of the even group YA1 at 362, sequence initiation relay KCR at 337 is energized through contacts JCR and YA1. Contact JCR at 338 has no effect unless ganged switches 214 and 215 are transferred from their automatic setting shown at 339 to their manual control. At such a setting, terminal 216 is connected to the flasher control and master clocking relay RCR is energized from leads 202 and 217 through switches 214 and 215 to contact JCR and terminal 216.

The initiation of a read-transfer operation initiates operation of the card punching machine. This results in the automatic deenergization of master clocking relay subsequent to the completion of the punching of all of digits 0 through 9 on the card for an interval of one half a punch cycle, between cycle 9.2 and 9.7. Terminal 218 is connected to a source within the card punch machine and terminal 219 is connected through a normally closed switch which is open between the 9.2 and 9.7 cycle of the machine. Accordingly with switches 214 and 215 on their "automatic" setting as shown the circuit through resistance 221 is maintained for relay RCR except during this brief interval.

Master clocking relay RCR is a primary reference for many of the system sequences. Its contacts at 361 and 396 control the transfer from one panel to the next in producing cards from the information accumulated in those panels. Its contact at 443 controls the advance from one work station set of panels to another work station set. Its contact at 506 controls the flip flop between odd and even work station group controls. Its contact at 513 synchronizes the zero set of the register in the work station AA1 panels by the driver.

*Punch card stepping sequence*

As shown in FIGS. 10, 11 and 12 the even and odd work stations are read out in accordance with the punch card stepping sequences established by this circuit. The YA and YB series of relays control the readout, the punching and verifying of cards, for panels in the even work stations while the XA and XB series control the readout of the odd work stations. Those relays with the A designation control the transfer control relays employed in the recording operation and initiate the punch-verify functions for each of the panels at a work station while those with the B designation control the reset of punch-verify functions, the advance of the work station stepping sequences and the sequence through the several panels for each work station. As was noted in the discussion of FIGS. 1 and 2 the several work stations which the present system sequences for read-transfer operations have from two to seven punched cards. When only the first two cards of a work station are to be read only the first two and the eighth punch card stepping sequence relays are utilized and the remaining relays of the sequence are bypassed to expedite the read-transfer operation for the next work station. Further, where any station is subject to a read-transfer operation the first two panels of the station comprising those which contain the production control information accumulated and preselected in panels of the AA1 and AA2 type are read, however there may be instances in which not all cards are desired for payroll purposes and hence not all employee cards need be produced for the worker or worker groups identified by the BB–1 type of panel. Accordingly, provision is made in the sequencing of the card punch operation to bypass selected BB–1 type panels.

The twenty-three work stations and the special group of panels corresponding to those for a work station are sequenced in operation by the work station stepping sequence advance relays ZA1 through ZA26 and their sequencing relays ZB1 through ZB26 as exemplified by the sample chain of relays ZA1 to ZA6 and ZB1 to ZB6 of FIG. 13 and ZA24 to ZA26 and ZB24 to ZB26 of FIG. 14. These sequencing relays enable readout of the work stations by sequencing techniques parallelling those of FIGS. 11 through 13 and are arranged to be inserted and removed from the programmed sequence by individual panel program initiation relays PB1 to PB26 of FIGS. 9 and 10.

At the initiation of a read-transfer programmed sequence all of the XA, XB, YA, YB, ZA and ZB families of relays are deenergized. The closure of contact JCR at 361 applies power from lead 202 to lead 222. Since master clocking relay RCR is energized, contact RCR at 361 is closed. Relay KCR at 337 is deenergized at this time hence its back contact at 360 is closed and a circuit is available to pull relay YA1 at 362 from lead 222 through coil YA1, isolation diode 223, contacts KCR and RCR to lead 201.

Relay YA1 seals itself at 362 for the interval contact RCR remains closed at 361 and at 363 for the interval required to advance through the even work station panels to relay YA8. It closes a contact at 363 to lead 224 activating the circuits for remainder of the advance and sequencing relays in the even work station group. The closing of contact YA1 at 337 energizes sequence initiation relay KCR to open its back contact at 360 and that relay maintains itself energized at seal contact at 338 until the master record start relay JCR is deenergized at the termination of a programmed sequence to open its contact JCR at 337. Opening of back contact KCR at 360 conditions the even and odd work station punch card stepping sequence relays to be dependent upon each other whereby the odd series follows the last of the even series and vice versa. Contact KCR at 491 is closed for the remainder of the read-transfer operation to enable the odd driver logic reset relay ZCR1.

Relay YA1 closes a contact at 348 which partially enables the energizing circuit for the transfer control relays TCR of the special group of panels, provided other conditions to be discussed below are met. For the initial sequences this contact has no effect.

The energizing circuit for relay YB1 is prepared by closure of contact YA1 at 364 without effect since the coil of that relay through limiting resistor 225 is shunted by diode 226 through contacts YA1 and RCR at 362 and 361 respectively, at this time.

Contact YA1 at 542 is closed to enable the A2 panel transfer control relays for the even group of work stations so that they are responsive to the work station stepping relays ZB.

Punch verify control relay for the even work stations PVCRB at 552 is energized by the closure of contact YA1 at 552 and remains energized until the last card punching cycle for the even work station. While energized it enables second calendar control relay CLCR2 at 354 through contact PVCRB at 354.

Contact YA1 at 554 energizes relay ZXCR at 553 during the first card cycle in a programmed read-transfer operation to separate the normal simultaneous punch and verify operations of succeeding work stations. After the first card is punched, the functions of this relay are no longer required and it is dropped for the remaining cards of that work station.

Upon the first operation of the switch in the card punch which drops relay RCR contact RCR is opened at 361 to remove the short across advance relay YB1 at 364. Relay YB1 pulls through contacts YA1 at 363 and 364 opening the circuit initially providing its inhibiting short with limiting resistance 225 and blocking diode 226 at back contact YB1 at 365. Contact YB1 at 366 is closed so that upon the reenergization of RCR to close contact RCR at 361 relay YA2 is energized from lead 222 through contact YA1 at 363 coil YA2, diode 223, contact YB1 at 366, lead 227, contact YA1 at 362 and contact RCR at 361. Relay YA2 seals itself by contact YA2 at 367 and connects sequence advance relay YB2 by contact YA2 at 368. However, the advance relay is inhibited at this time by resistance 225, diode 226 and the shunt through back contact YB2 at 369, lead 227, contacts YA1 at 362 and RCR at 361. Thus, if no disrupting circuits are established the sequencing advances through the even work station, punch card stepping sequence in accordance with the brief opening of contact RCR at 361 following the final punching operation in the punch card machine for each card corresponding to a panel of the work station. Relay YB2 will pull during the next opening of contact RCR to pull YA3 by contact YB2 at 371 when RCR restores. Relay YA3 will seal itself and prepare a circuit to pull YB3 when its inhibiting circuit is broken and so forth through the pulling of relay YB7 to pull YA8 at 395. This completes a sequencing of the even work station panels in the read-transfer operation and conditions the odd work station panels to enter the read-transfer sequence. Contact YB1 at 442 closes at the end of the first even card cycle to enable the next relay in the work station stepping sequence of FIG. 13 so that during an odd station punching sequence an even station is conditioned for punching as by memorizing the values in its registers. Only one step per punch card stepping sequence is available since at the termination of the second card cycle of the sequence, back contact YB2 at 442 opens to disable further advances through the opening and closing of master clocking relay contact RCR at 443. A similar enabling, restricted to the second card cycle is afforded the odd-even flip flop control of relay F1CR by contact YB1 and back contact YB2 at 507. Punch-verify separation relay ZXCR is dropped by opening back contact YB1 at 554 at the end of the first card punching cycle of a sequence. The zero set sequence control is enabled at the end of the second card punching cycle by closure of contact YB2 at 514 and the reconnection of the driver to the contacts of memory matrices and the registers of the AA1 panel whereby the zero setting pulse train of the driver is applied to the registers to set them to zero is accomplished by energizing the transfer control relay for that AA1 panel as enabled by contact YB2 at 524 at the end of the second or subsequent punch card cycle.

In addition to the sequencing functions of the relays of the YA and YB series the higher order YA relays also control the punch-verify relay for the employee or payroll punch card cycles as shown in FIG. 18. Contact YA2 at 563 pulls the first employee punch-verify relay and holds it during the punching cycle for that card. In the next card cycle contact YA3 at 565 pulls the second employee punch-verify relay BB1PVCR2 and back contact YA3 at 563 drops relay BB1PVCR1. The higher order YB relays drop the employee transfer control relays as by opening back contacts YB3 at 582 and YB4 at 586 in the final portion of the card cycle following that in which the punched card is verified.

The punching operation is completed for a work station group at the time the eighth stepping relay is energized, relay YA8 in the present example. However certain circuit relationships are retained for an additional card cycle in order to complete the verification of the final card punched for the work station. This verification requires comparison of the punched values in the card with the setting of the sources which actuated the punch solenoids, particularly the relay matrices and the tap switches. Accordingly the transfer control relay of the A2 series illustrated in FIG. 17 is held for the first card cycle of the next punch card stepping sequence through contacts XA1 at 541 or YA1 at 542 to maintain the necessary connections.

Relay YA8 at 395 pulls as the master clocking relay is reenergized in the final portion of the last card punching cycle for an even work station. Back contact YA8 at 363 opens without effect at this time since relay YA1 is held through closed contact RCR at 361 and contact YA1 at 362. In the final portion of the next card cycle contact RCR at 361 opens briefly to break the hold circuit for relay YA1 and reset the even punch card stepping sequence. Relay YA8 permits reset of the even stepping sequence relay group by its open back contact YA8 at 363 removing the interlock to YA1. Relay YA1 drops and opens its contact at 362 thereby opening the holding circuits for itself. Contact YA1 at 363 is opened thereby deenergizing relays YA2 to YA7 and YB2 to YB7 by interrupting the supply to lead 224. YA8 drops when RCR opens since YA8 does not seal itself in.

Relay YA8, upon being energized opens a back contact at 559 to deenergize the BB1 PVCR relays. It closes contact YA8 at 500 and opens back contact YA8 at 503 to pull even reset relay 104. It opens back contact YA8 at 552 to drop even punch-verify relay PVCRB.

The drop of relay YA8 in addition to resetting the even punch card stepping sequence closes back contact YA8 at 503 to energize even reset sequence relay 106.

The odd work station, punch card stepping sequence relays XA1 through XA8 are sequenced through the operation of master clocking relay RCR by contact RCR at 396. When relay RCR dropped to energize relay YB7 and then picked to energize relay YA8, contact RCR at 396 closed and one relay operating interval thereafter contact YA8 at 396 closed to energize relay XA1 through blocking diode 223. Contacts XA1 at 397 closed to seal around YA8 which has energized the advance inhibiting circuits connected to lead 228. Contacts XA1 at 398 connects bus 222 to bus 229 supplying all subsequent relays in the sequence. Contact XA1 at 398 in series with back contact XA8 seals XA1 to bus 201.

The odd station relays XA1 through XA8 and XB1 through XB7 operate in much the same manner as their counterparts for the even stations. The advance inhibiting circuit to lead 228 is interrupted seven times during seven punch card machine cycles to successively operate sequence relays XB1 through XB7 and upon each termination of the interruption a next succeeding stepping sequence relay XA2 through XA8 is energized.

Upon the energization of master clocking relay RCR following the discontinuance of the inhibiting circuit for relay XB7 at 428 stepping sequence relay XA8 at 431 is energized and one card cycle thereafter the reopening of contact RCR at 396 in conjunction with open back contact XA8 at 398 resets the odd station relay group. This drop relay XA1 opening the energizing circuit between bus 222 and bus 229 by contact XA1 at 398, opening the seal for XA1 in series with back contact XA8 by contact XA1 at 398 and opening the advance control circuit to lead 228 at contact XA1 at 397. Even station relay group YA1 to YA8 is initiated by the closure of contact XA8 at 367 to enable YA1 to pull when master clock relay RCR pulls.

In the above discussion of the punch card stepping sequence relay series it has been assumed that seven cards were punched for each even and odd sequence. As noted above, the number of cards actually produced may vary between two and seven; accordingly, the present system is arranged to ascertain the number of cards and the panels to be introduced into the read-transfer operation for each work station operating sequence. Any work station to be subject to the read-transfer operation will include a production control card including the information accumulated in the registers of its AA1 panel and the present data in its A2 panel. This card is produced during the first step of the punch card sequence while only XA1 or YA1 is pulled. Employee information or additional production information cards are produced while subsequent relays of the series are operated. Thus if the work station has but one AA1 panel the next panel from which card information is derived is a BB1 panel for an employee and a read-transfer of panels AA1, A2 and BB1 occurs while XA2 or YA2 is energized. Similarly subsequent employee panels can be read during succeeding operations of the XA or YA relay series.

It may occur that the first BB1 panel is not to be read. If the second panel group is to be skipped XA2 or YA2 should not be the highest numbered relay operated in the series, but rather the relay corresponding to the next panel group to be subject to read-transfer should be energized. This skipping of one or more panels is accomplished by simultaneously energizing several relays in the stepping sequence. If the second panel is skipped and the third read in the even group, relay YA2 and YA3 are energized by YB1 when master clocking relay RCR pulls following energization of YB1. If the fourth panel group is to be skipped following the reading of the third panel group, on the next drop of RCR advance relays YB2 and YB3 are energized simultaneously by the interruption of their inhibiting circuits and closed contact YB3 at 376 in conjunction with the pulling of relay RCR energized YA4 and YA5. Upon completion of the punch operation for the fifth panel group the sequence can continue through the sixth and seventh panel groups or if such panel groups are not to be read the sequence directly energizes YA8 to initiate the sequencing of the next group and at the end of the first card cycle of the next group reset the preceding group.

The number of cards to be produced in the even group of work stations ranges from three for station E to five for station C. There are from seven to two cards required for the odd work stations the maximum being for station B and the minimum for stations G and GS. The illustrative system was constructed to afford a range of flexibility and accordingly the odd and even punch card sequences are each arranged for seven card operations per work station read-transfer. In no instance illustrated can the even group YA1 to YA8 and YB1 to YB7 employ more than five punch card cycles and hence relays YA6, YA7 and YB6 can be considered extra.

The superfluous relay sequences are automatically avoided in the punch card stepping circuits by bypassing those XA or YA relays following the last card cycle for the station, and directly energizing the sequence terminating relay XA8 or YA8. In the case of even work station E a maximum of three cards can be produced, one production record and two payroll records. Accordingly when YA4 is energized relay YA8 is also energized and the information from the next odd work station is recorded next. In associating each work station with the equipment a transfer control relay for its A2 panel is energized. Relay A2TCR for station E closes its contact at 381 when the information from that station is being recorded. The stepping sequence advances, producing a production card while in the first step and a payroll card for each of the second and third steps. Upon completion of the third card punch, contact RCR at 361 is opened to energize relay YB3 at 373, and then closed to pull in relay YA4 and apply a potential to lead 241. This is passed to lead 243 and relay YA8 so that the next punch card stepping sequence is initiated and following the next card cycle the preceding sequence is reset. Ordinarily second calendar control relay CLCR2 at 354 is energized to open its back contact at 376 so that no bypass of cards occurs by the path it provides.

The remaining even work stations automatically reset the punch card stepping sequence at latter points as with relay YA5 for all but station C through A2TCR contacts at 386 and with relay YA6 for station C at contact C–A2–TCR at 390. Reset paths of this type are also available in the odd punch card stepping series after the second card and upon energizing XA3 for stations GS and G at the A2TCR contacts at 411, at A2TCR contacts at 421 for stations H2, H4, H6, H8, H10, H12 and A3–2 when XA5 is pulled, and at contact D–A2 TCR at 424 when XA6 is pulled for station D.

The bypassing of panels is manually selected at some convenient location such as at the central monitoring station by means of switches individual to the panels. Switches 231 at 370 enable the bypassing of the second panel for an even numbered work station by energizing at least one YA relay subsequent to YA2 when YA2 is energized. These switches are rendered effective by transfer control relays for the A2 panels of each work station and are identified by the work station designations as set forth in FIG. 1 wherein stations H1, H3, H5, H7, H9, H11, H13, F1, C, E, A3–1 and A3–3 are treated as even work stations as labeled above the series circuits for the switch and TCR relay contact of that station. Thus, if the H1 work station were set to bypass, the read-transfer of the first employee panel switch 231 for H1 would be closed and closed contact A2–TCR for H1 would complete an energizing circuit for relay YA3 at the time relay YA2 was pulled from contacts RCR at 361, and YA1 at 362, lead 227, contact YB1 at 366, diode 223, to lead 232 to coil YA2 and lead 224, and to lead 233, bus 234 common to all of the skip control circuits, switch 231 for H1, contact AA2–TCR for H1, bus 235, lead 236, coil YA3 and lead 224.

Skip circuits can be selectively set up for the second employee panel by causing the pull in of relay YA4 with YA3 through the setting of switches 237 for the several work stations and transfer control relay contacts A2–TCR for those stations in the manner described above. Further, skip circuits can also be established for the third employee panel by means of switches 238 in conjunction with relay contacts A2–TCR for those panels in those instances where a third employee panel is provided. Station C can have its fourth employee panel bypassed if switch 249 at 385 is closed and automatically resets the sequence following YA5 since operation of relay YA6 at 388 with contact C–A2–TCR at 390 closed also pulls YA8.

The odd work station, punch card stepping sequence relays of FIGS. 11 and 12 are arranged for skipping panels in the read-transfer operation in the manner of the even group sequencing. However, included within the exemplary odd group of stations H2, H4, H6, H8, H10, H12, D, A3–2, G1 and GS is a station with seven panels, B. Thus each of sequencing relays XA1 through XA7 can control at least one read-transfer of a panel, whereas in the even group relays YA6 and YA7 had no control function and were included merely to provide for furture expansion of the system. Any station can be set to bypass its second panel by closing its switch 251 at 405 in series with its A2–TCR contact at 406. All stations can bypass their third and subsequent panels if first calendar control relay CLCR1 at 351 is deenergized to close back contact CLCR1 at 411. Stations GS and G have no need for additional read-transfer functions since they have only two panels to be read and, therefore, they automatically skip the third and subsequent cycles by activating lead 252 through their A2TCR contacts at 411 to energize relay XA8 with relay XA3. Selective skipping of the third panel for the remaining stations is set up by means of switches 253 at 410 operating in conjunction with relay contacts A2–TCR at 411 for those stations to couple the energizing path for relay XA3 with that for relay XA4. The fourth panel is selectively skipped by simultaneously energizing relays XA4 and XA5 through contacts of relays A2–TCR at 416 and switches 254 at 415 for the stations H2, H4, H6, H8, H10, H12, B, D and A3–2. Automatic bypassing of the fifth and sixth panels is accomplished for all but stations D and B through contacts of relays A2–TCR at 421 for those stations. Stations D and B1 are selectively bypassed at the fifth panel by switches 255 at 420 and their A2–TCR relay contacts. Station D automatically bypasses the fifth panel at relay contact D–A2–TCR at 424 and station B1 selectively bypasses the sixth and seventh panels through switch 256 at 425 and 257 at 429 cooperating with its relay contacts B1–A2–TCR at 426 and 430.

The first two card cycles in a read-transfer sequence are employed to develop the proper relationship of the various operating sequences. Accordingly two unpunched cards are issued by the card punch machine. In the first cycle when relay YA1 is initially pulled the sequence initiating circuit is released to permit alternate operation of the odd and even punch card sequences by opening back contact KCR at 360. The remaining functions of YA1, other than those of advancing the sequence, have no effect at this time since no work station relay of the ZB series has yet been energized.

Figure 15:
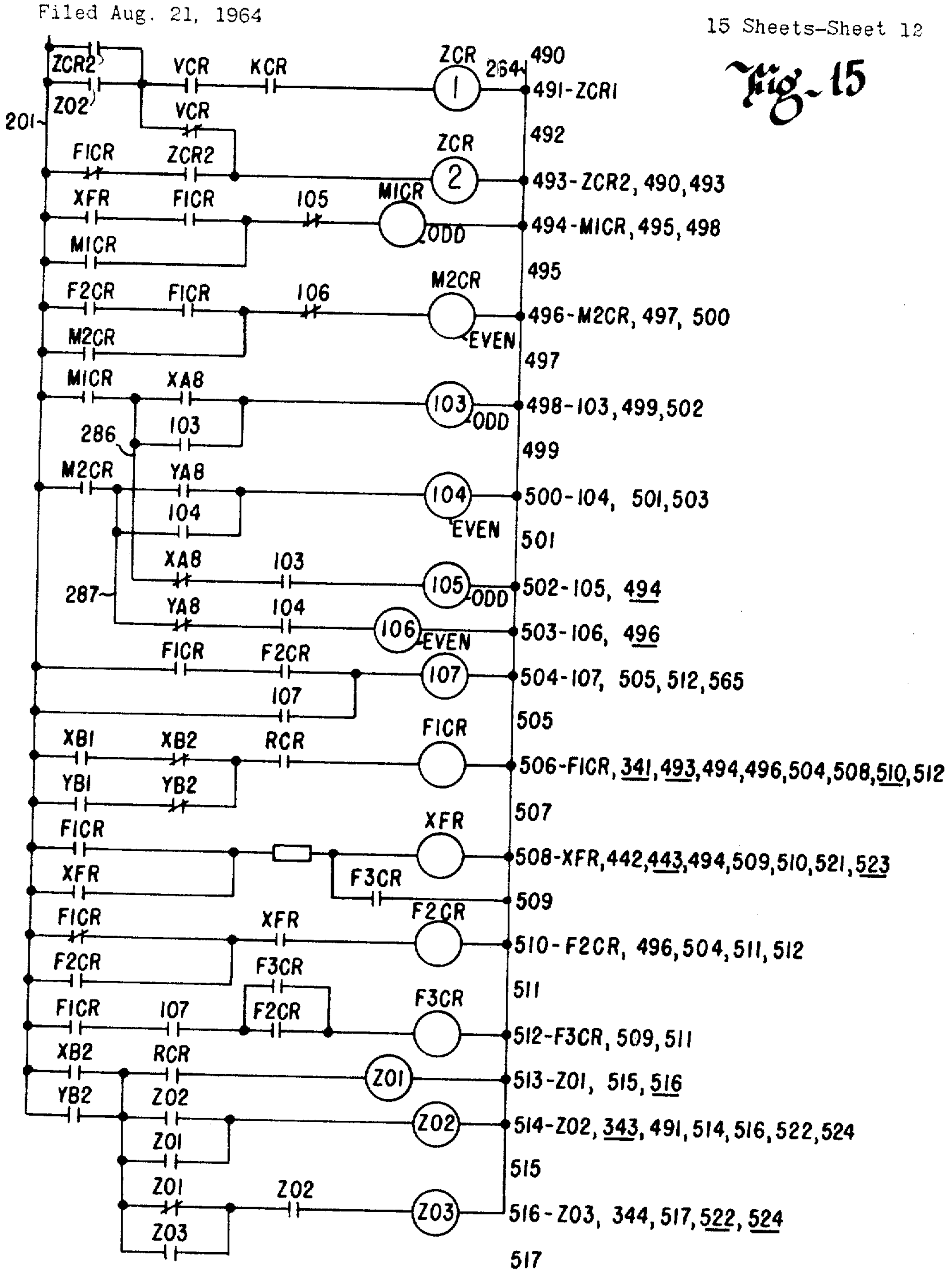
FIG. 15 is an across the line diagram of the sequencing controls which establish the coupling of the driver to the odd and even memories and work stations and reset those memories.

In the terminal portion of the first cycle relay YB1 is energized to enable the initiation of the work station stepping sequence of FIGS. 13 and 14 by closing its contact at 442 and the odd-even flip-flop of FIG. 15 is initiated by a contact at 507. The selection of the first programmed odd work station occurs just prior to the termination of the first card cycle and the registers of that station's AA1 panel are read into the group of odd memory relay matrices during the second card cycle while YA2 is initially energized.

*Work station stepping sequence*

In order for a punch card stepping sequence to be effective a work station must be selected to which that sequence will apply. The work stations are selected in accordance with the operation of the relay series ZA1 to ZA26 and ZB1 to ZB26 of FIGS. 13 and 14. This sequence advances only upon the completion of the first card cycle of a work station punch card stepping sequence. It connects the AA1 panel of a work station of the group opposite that currently being punched to the driver and memory for that group for the initial reading of the information from the registers on the panel into the memory and following that sequence, it connects the memory and the tap switches of the AA1 and AA2 panels to the emitter.

Initially ZA1 at 444 is energized by the pull of relay YB1 at the end of the first card cycle to close contact YB1 at 442 coupled with the reenergization of master clocking relay to close contact RCR at 443 so that an energizing circuit is available for relay ZA1 from lead 202, contact JCR at 440, back contact PB26 at 441, lead 264, coil ZA1, blocking rectifier 260, blocking rectifier 263, lead 262, contact RCR at 443 and contacts YB2 and YB1 at 442 to lead 201. Relay ZA1 seals at 445. It prepares a circuit for ZB1 at contact ZA1 at 446, although the limiting resistance 267 and the shunt through diode 268 and back contact ZB1 to lead 262 prevents energization of ZB1. Back contact ZA1 at 348 opens to prevent a manual actuation of the special panel at 345 push button 270. Contact ZA1 at 521 closes to pull transfer control relay for the first AA1 panel AA1TCR1. At this time relay XFR is energized, as will be explained, hence contacts XFR at 442 and 521 are closed while back contacts XFR at 443 and 523 are open.

With YA2 energized during the second card punching cycle contact RCR at 361 is closed and a second blank card is produced. At this time the driver causes the registers of the first odd work station, station GS in the example, to be memorized in the odd memory 63 as for cycle 0 of FIG. 5. As the card cycle is terminated and contact RCR at 361 opens relay YB2 is energized so that relay YA3 is conditioned to pull when contact RCR recloses. At this time, second calendar control relay CLCR2 is deenergized and back contact CLCR2 at 376 is closed so that relay YA8 is energized with relay YA3 to abbreviate the even punch card stepping sequence and initiate the odd punch card stepping sequence through contacts RCR and YA8 at 396.

In FIG. 13 the energizing circuit for the work station sequence relays of the ZA series is opened during the second and succeeding card cycles for the currently selected work station by the opening of the back contacts YB2 at 442 for an even station at XB2 at 441 for an odd station.

Relay XA1 at 397 pulls to begin the odd punch card stepping sequence at the end of the second card cycle in response to energization of master clocking relay RCR. Relay ZB1 at 446 pulled during the previous drop of RCR through the removal of the shunt around its coil when contact RCR at 443 opened. Contacts XA1 and ZB1 are closed at 541 to energize relay A2TCR1 through contacts ZB3 and PB1 at 541. This relay couples the memory matrices and the tap switches of the AA1 and A2 panels to the emitter so that a card is punched during the card cycle which follows as shown in FIG. 5. Relay ZB1 opens its back contact at 521 to disconnect the original energizing path for relay AA1TCR1.

When relay XB1 closes its contact at 441 and contact RCR at 443 closes at the end of the third card cycle, the next work station sequence relay ZA2 is energized at 448. In the assumed case, the second station is programmed for read-transfer with the first station and has its relay PB2 energized. Open back contact PB2 at 449 therefore functions in the manner of PB1 at 445 to prevent the energization of subsequent station sequence relays at this time. Relay ZA2 conditions the sequence advancing circuits by closing a contact at 450 and seals itself by a contact at 449. It opens a back contact at 521 holding open the energizing circuit for relay AA1TCR1 when XFR operates during subsequent work station cycles and closes a contact at 523 to energize relay AA1TCR2 whereby the first even work station H1 is connected to the driver and even memory 64 to memorize the values accumulated in its registers.

The work station stepping sequence follows the above outlined sequence subject to the control of the contacts XB1 and XB2 at 441 and contacts YB1 and YB2 at 442 to advance only at the end of the first card cycle of each punch stepping sequence and subject to the alternate odd station-even station control of the contacts XFR at 442 and 443. Stations are skipped in this sequence when their relay PB is not energized since the back contacts of those relays between successive relays of the ZA series is not opened under these circumstances and several ZA relays are simultaneously energized. Thus, if the second and third stations were to be skipped relays PB2 and PB3 would not be energized and contacts PB2 at 449 and PB3 at 453 would be closed at the time relay ZA2 was energized. These contacts would afford an energizing path for relays ZA3 and ZA4. Only the highest rank of energized ZA relay is effective to place its station in the read-transfer sequence, hence, the first station and then the fourth station would be subject to read transfer.

The alternate energization and deenergization of odd-even transfer relay XFR avoids simultaneous energization of odd and even ZB relays through the selective enabling of one group or the other as connected to leads 265 and 269 of FIG. 13. In setting the program to skip work stations the PB relays typified by those of FIG. 8 are maintained deenergized. When the first panel is to be skipped, for example, relay PB1 at 305 remains deenergized. This holds back contact PB1 closed at 445 so that the first completed circuit to lead 262 energizes both of relays ZA1 and ZA2. It also holds contact PB1 at 541 open. Assuming the second panel is to be subjected to read-transfer and PB2 at 310 is energized, back contact PB2 is open so no lower order ZA relays are energized at this time and contact PB2 at 542 is closed. When contact RCR opens near the end of the first card cycle, only ZB1 is energized since relay XFR has operated to connect lead 265 to a source and disconnect lead 269 supplying ZB2. Since contact PB1 at 541 is open, the operation of ZB1 has no effect on transfer control relay A2TCR1. With relay A2TCR1 inoperative calendar control relay CLCR1 at 351 is not energized since contact A2TCR1 at 350 is open and contact CLCR1 abbreviates the even punch card stepping sequence to two card cycles through contact CLCR1 at 411. Two blank cards are thus issued for each skip operation where the panel to be skipped is of the family scheduled to be subject to read transfer.

When the odd punch card stepping sequence is initiated and relay XFR is dropped, relay ZB2 pulls at 450 to pull relay A2TCR at 542 whereby the second calendar control relay CLCR2 at 354 is pulled to open contact CLCR2 at 376 and to permit the normal punch card stepping sequence for the even family. Similar skipping sequences are available for each of stations having relays PB2 through PB24 when any of those PB relays are not operated.

In order to avoid excessive currents in the PB contacts and isolating diodes 263 of FIGS. 13 and 14, the skip circuits have been set up in groups of five ZA relays. Thus if all of relays PB1 through PB6 were deenergized only relays ZA1 to ZA5 would draw current through diode 263 at 444 and the PB contacts in work station skip control bus 273. Relay ZA6 would be energized from lead 262 through contacts PB5 and ZA5 at 465 as would subsequent ZA relays to ZA10 (not shown). Similar connections (not shown) are made for relays ZA11 through ZA15 and ZA16 through ZA20.

Figure 16:
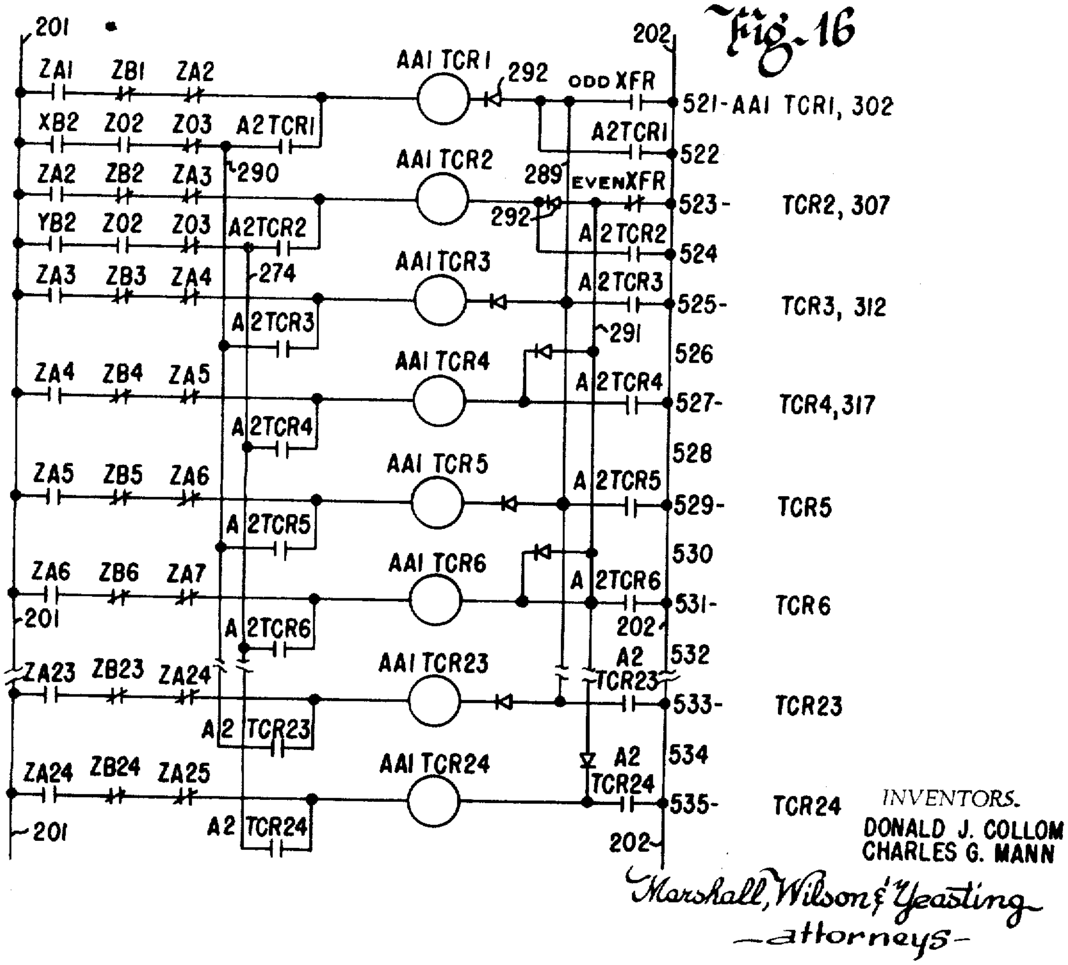
FIG. 16 is an across the line diagram of the transfer controls employed in connecting the AA1 panels of FIGS. 1 and 2 to the read-transfer equipment.

The premature energization of a transfer control relay for the AA1 panel is also prevented by the operation of odd-even transfer relay XFR. In FIG. 16 when the first station is to be skipped its AA1TCR1 relay is barred from energization by relay ZA1 since relay ZA2 back contact at 521 opens. Contact ZA2 at 523 closes at this time and would pull relay AA1TCR2 but for the open back contact XFR at 523 which isolates but 291 for the even series of relays from bus 202. This maintains the proper synchronization of the memory functions since no even memory will be coupled unnecessarily to the driver and the registers of the bypassed work station.

*Memorizing sequence*

Consider the program sequencing controls of FIG. 8. When relay ZA1 causes relay AA1TCR1 to be energized, to couple the memory, the registers and the driver. Relay AA1TCR1 closes its contact at 302 in series with closed contact PB1 to energize relay PC1. Relay PC1 seals around contact AA1TCR1 by contact PC1 at 303 and holds relay JCR by contact PC1 at 333 when relay PB1 is dropped. The PC relays isolate the registers in the work station AA1 panel with which they are associated from their normal signal sources to prevent the admission of additional information into the registers when they are in the read-transfer operation (by means not shown).

The preponderance of the AA1TCR1 relay contacts are illustrated in the cofiled patent application wherein they couple the register of a work station to the driver and a memory group. The initiation of the readout of the registers into the memory group is by means of a start signal to the driver. This signal is issued during the second card cycle of each punch card stepping sequence in response to the drop of relay XCR at 341. During the second card cycle contact YB1 and back contact YB2 at 507 are closed to pull first flip flop control relay FICR at 506 and open back contact FICR at 341 to drop relay XCR. The driver pulses the registers and set the memory matrices according to the cofiled application during this second card cycle.

*Punch operation*

The completion of the initial memory function for the AA1 panel of the selected work station through the coupling afforded by transfer control relay AA1TCR1 of the registers and memory is followed by a card punching cycle initiated by the energization of the A2 panel transfer control relay A2TCR1 to couple the information sources to the card punch through the emitter.

Relays of the A2TCR series in FIG. 17 have a number of sequencing functions. Considering relay A2TCR1 as an example, it closes a contact at 304 to place a shunt through diode 275 across the coil PB1 and drop that relay while sealing PC1 around the opened contact PB1 at 302. The contact PC1 at 333 supplants the lost hold circuit of contact PB1 at 331 for relay JCR. Closure of contact A2TCR1 at 350 energizes first calendar control relay CLCR1 to cause a preset date signal to be supplied to the emitter and to break the bypass of punch card steps at back contact CLCR1 at 411. Punch card bypassing for the GS station is made available for selective operation by switch 251 at 406 by contact A2TCR1 and is assured for fourth and subsequent card sequences by contact A2TCR1 at 411. Two circuits for relay AA1TCR1 are enabled at 522 by contacts A2TCR1 so that the registers can be reset by recoupling them to their memory relay contacts and the driver. A self sealing circuit around reset contact PB1 at 541 is made at 541. At 630 the transfer control relay for the BB1 panel of the station, relay GS–BB1TCR1 is enabled by closure of contact A2TCR1 so that this relay can be sequenced by the punch card sequence controls.

The initial card cycle in which an A2TCR relay is energized is that in which the production control card receiving information from panels AA1 and A2 is punched. In the following card punch cycles for the work station the payroll cards including employee information from the one or more effective BB1 panels are punched. These cards are sequenced by the transfer control relays exemplified in FIGS. 19 and 20 for the even and odd stations respectively.

As will be discussed with respect to FIG. 7, a punch-verify control is required for each card produced. A punch-verify relay must be energized for each punching operation; in the verification of a card either the punch-verify relay must be dropped or the punch-verify separation relay must be dropped. Accordingly, the punch-verify relays for the information derived from the AA1 and A2 panels, the information punched into each card for a work station, are maintained energized until the last card is punched. Separate punch-verify relays are available for each punch cycle in which individual and distinct panels are the sources of information. Thus the BB1 panels have individual punch-verify relays which are energized only during the card cycle in which the information from the associated panel is punched. These BB1 punch-verify relays operate in conjunction with the punch-verify relays of the AA1 and A2 panels. The production cards are subject to punch-verify relays PVCRA and PVCRB at 551 and 552 for odd and even work stations respectively. However in the case of the payroll cards, where a multiplicity of cards for different employees are to be produced, the punch-verify relays of FIG. 18 control the sequencing of the transfer control relays of FIGS. 19 and 20 to associate the BB1 panels with the card punch emitter during the proper card punch cycles.

The transfer control relays for the BB1 panels operate in conjunction with the punch-verify relays and in a manner parallel to the transfer control relays of the A2 series. That is, they remain energized during the card cycles in which the cards recording the information from the panels with which they are associated are being punched and verified. They couple this information source to the emitter. Hence in the case of BB1 panels the transfer control relays are first energized immediately prior to the punching card cycle for the employee they identify and remain energized for the following verifying card cycle. They are dropped at the end of the verifying card cycle.

When relay XA2 pulls for the second card cycle of the odd card punch sequence it closes contacts at 402 and 403 to condition the next step of the card punch sequence. It opens back contact XA2 at 348 to insure against punching a second card when the special panel controlled through the associated circuits is activated by push button 270. Contact XA2 at 562 is closed to energize the first punch-verify relay BB1PVCR1 for the BB1 panel of the work station at 563 through closed contact XA3 at 562. In addition to the punch-verify functions as typified in FIG. 7, relay BB1PVCR1 closes contacts at 584 and 612 in the even and odd transfer control relay circuits for the BB1 panels. The closure of contact BB1PVCR1 at 584 has no effect at this time since no A2TCR contact for the even work stations is closed to complete a circuit to lead 202. Closure of contact BB1PVCR1 at 612 energizes bus 276 and since contact GSA2TCR1 at 630 is closed, relay GS–BB1TCR1 is energized through lead 277. This relay seals itself at 630 to lead 278 and bus 279 which is connected through back contact XB3 at 611 to bus 201. With relay GS–BB1TCR1 energized, the information set on the tap switches of the BB1 panel for station GS is punched in a card with that derived from panels AA1 and A2.

During the second card punching cycle for odd station GS the memory for the next even work station H1 is set by energizing the transfer control relay for that station and actuating the read cycle of the driver. Thus the closure of contacts XB1 at 441 and RCR at 443 at the termination of the first card punching cycle for station GS pulls relay ZA2 through lead 262 and contact ZB1 at 448. Relay ZA2 pulls transfer control relay AA1TCR2 by closing contact ZA2 at 523 since back contact XFR at 523 is closed at this time. Relay AA1TCR2 couples the driver the even memory group and the registers of the AA1 panel for station H1 whereby those registers can be read into the memory group.

First flip flop relay FICR is also energized at the termination of the first card punching cycle for station GS by a combination of XB1 and RCR contacts at 506. This drops drive start relay XCR so that the driver is caused to generate a read series of pulses and the memory is set with the values on the registers of station H1.

At the end of the second card punching cycle for the odd sequence relays XA3 and XA8 are pulled and the next work station enters the card punch cycle. The next card cycle is the first punching cycle for the even station H1 and the final verifying cycle for the preceding odd station GS. Relay YA1 establishes the connection for punch signals employed by the card punch while relay XA1 establishes the verifying connections between the information sources and the card reader. Contact XA1 at 541 remains closed to hold relay A2TCR1 energized at 541 while open back contact XA8 at 551 drops relay PVCRA to enable the verify function for the information from the AA1 and A2 panels for the employee card. Further, contact A2TCR1 at 630 holds relay GSA2TCR1 while back contact XA3 at 562 drops relay BB1PVCR1 to enable the verify function for the information from the BB1 panel for the employee card.

Accepting that relay XFR is deenergized at this time, as will be discussed, since relay ZA2 was pulled during the preceeding card cycle, when contact RCR at 443 opened to release the shunt lock out of relay ZB2 at the end of that card cycle relay ZB2 at 450 pulled. With contact ZB2 closed at 542, the closing of contact YA1 at 542 at the initiation of the even card punch sequence pulls relay A2TCR2. This couples the memory group and tap switches panels AA1 and A2 for station H1 to the card punch emitter so that a card is punched with production information during that card cycle. The opening of contact RCR at 396 also drops the odd punch card stepping sequence at this time.

The next card cycle punches the first employee card for station H1 and verifies the production card. Verification of the production card is accomplished by dropping relay ZXCR at 553 through the opening of back contact YB1 at 554 at the termination of the preceding card cycle to couple the emitter to the verifier. Punching of the employee card is accomplished by maintaining relays A2TCR2 and PVCRB while energizing relays H1–BB1–TCR1 at 590 and BB1PVCR1 at 563 to couple the memory groups and tap switches of panels 2AA1, A2 and BB1 to the punch solenoids. The pull of relay YA2 in the second card cycle of the even station sequence closes contact YA2 at 563 to pull relay BB1PVCR1 and close its contact at 584 to activate bus 281 from bus 201. Since contact A2TCR2 at 593 is closed, the first BB1 panel of station H1 is connected to the card punch emitter by pulling relay H1–BB1TCR1 at 590 through bus 281, lead 282, the relay coil isolation diode 283 and contact A2TCR2. Relay H1–BB1TCR1 seals itself at 590 through lead 284 and bus 285 to back contact YB3 and bus 201. The first employee card is punched and then relay YA3 at 372 is pulled.

During the third card cycle for station H1, the second employee card is punched from the second BB1 panel for that station. Back contact YA3 at 563 is opened at this time to drop relay BB1PVCR1 to set the verify circuits for the first employee card. The transfer control relay H1–BB1TCR1 at 590 is held by back contact YB3 at 582 during the next card cycle. Contact YA3 at 565 closes for the second employee card punch cycle and with closed contacts 107 and YA4 at 565 energizes relay BB1PVCR2 to close its contact at 588 and pull relay H1–BB1TCR2 through bus 286, lead 287, the relay coil, diode 283 and contact A2TCR2 at 593. This connects the second employee panel BB1 for station H1 to the card punch emitter and enables a second employee card to be punched for that station. During this card cycle the previous employee card was verified by comparing its punched information with that set in its BB1 panel, the memory and the A2 panel. Verification requires the connection of the panels to the emitter by the transfer control relay. This connection is broken only at the end of the second employee card cycle when relay YB3 is pulled to open its back contact YB3 at 583 and drop relay H1–BB1TCR1 at 590.

If additional employee cards are to be produced, additional punch verify and transfer control relays for the BB1 panels are sequenced. Station H1 has a maximum three employee cards and only three transfer control relays for the BB1 panels. Even work station C is illustrated with four BB1 panels and in FIG. 19 has four TCR relays at lines 581 to 587. The odd work station B has six work panels and as illustrated in FIG. 20 at lines 611 to 616 has six TCR relays. It is these six relays and BB1 panels that utilize all six of the punch-verify relays in FIG. 18. All other work stations use less than the entire group of BB1PVCR relays.

*Verification*

Following each card punching operation the card is verified against the information sources. During this punching and verification the A2 panel transfer control relays couple the memory matrices to the card punch emitter and the punch verification reader. The controls for these functions are shown in FIG. 7.

A card reader is positioned immediately adjacent the card punch. It functions in synchronism with the punch. That is a card is advanced in ten steps through both the punch and the reader. When the card is in its first or zero punching position the next preceding card, that just previously punched, is in its first or zero reading position.

The card punch is provided with eighty punches and their actuating solenoids while the reader also has eighty digit reading stations. The emitter has ten digit value buses to which a signal is individually applied in sequence and to which all information sources are selectively connected either through a contact matrix or a tap switch. Thus all digits of value zero for the card in the punch are punched simultaneously with the reading of all zero digits of the next preceding card. This enables the emitter to be employed to route signals to both the punch and reader. The punch and reader simultaneously consider all digit positions. In FIG. 7 two digit positions are considered, one representing a digit derived through a relay matrix memory from a register on each AA1 panel and one representing a digit set on corresponding tap switches of three employee panels of a given work station. These digit information sources are coupled to punch card emitter terminals by transfer control relay contacts and their functions are shifted between punch operation and verification by means of panel verify relay contacts. Thus each of the twenty three programmed work station panel groups can utilize these digit positions as they are operated upon.

The digit information in the memories is coupled to the card punch emitter by means of transfer control relays of the A2 panel which also couple the tap switch set information to be punched from the AA1 and A2 panels. That information from the tap switches of the BB1 panels is coupled to the card punch emitter by the transfer control relays of the BB1 panel. The punch-verify selection by punch-verify relays is similarly associated with the A2 and BB1 panel controls.

In the case of the punch verify relays for the BB1 panels a plurality of panels must be selectively coupled for an individual work station. Therefore, individual punch-verify relays are provided which are selectively and individually operated during the read-transfer of a station. Since only one source of production information is considered, the punch-verify relays for the AA1 and A2 panel information is controlled through a single set of punch-verify relays PVCRA and PVCRB.

Punch-verify operations are cross connected for the odd and even station digits of the AA1 and A2 panels and are therefore provided with supplemental isolation means, relays OPCR, EPCR and ZXCR so that a verify operation for the last card of one panel does not affect the punch operation of the first card for a subsequent panel.

Consider first the punch and verify functions with respect to the assumed first and second effective card cycle as diagrammed in FIG. 5. Once placed in operation, the card punch proceeds through repetitive card cycles until it is stopped and the controls of this system are synchronized with the card punch. In the first cycle the production control card for station GS is punched by the pull of relay A2TCR1 at 541 when relay XA1 and ZB1 are pulled. This closes contact A2TCR1 at 640 and at 350. Since contact XA1 at 551 is also closed at this time, odd punch-verify relay PVCRA pulls at 551 to close its contacts at 640 and 351 and open its back contact at 641. Relay OPCR pulls at 352 to close its contact at 640. As a result a path is available from odd memory 79 over lead 84 and contacts A2TCR1, OPCR and PVCRA at 640 to punch magnet 74. At this time the connection to coil **75*a* of the verify relay is open by back contacts ZXCR at 642 and PVCR at 643 to avoid the application of the signal on lead 84 to that relay. When the emitter scan contact 76 engages the contact 77** for digit value bus set in the memory, the punch is actuated to mark the card which has advanced its punch position in synchronism with the emitter scan.

Since relay XA1 remains energized throughout the remainder of the odd punch card stepping sequence, relay A2TCR1 is held energized until the sequence is reset thereby holding relay OPCR at 352 until the opening of back contact XA8 at 350 one card cycle prior to the end of the sequence. Relay PVCR is also held until back contact XA8 at 551 opens. Hence the information in the memory is punched for each card cycle by the scan of the emitter contact 76 across contact 77. Punch-verify separation of relay ZXCR at 553 is held only until the final portion of the first punch cycle at which time back contact XB1 at 553 opens to permit back contact ZXCR at 642 to close.

During the second card cycle the first card punched, the production card for station GS, advances through the reader and is verified against the memory signal used to punch the second card, the employee card for station GS. As the cards are advanced emitter scan contact 76 encounters the digit value contact 77 for odd matrix 79 and verify scan contact 92 advances along digit value contacts 91 to apply a potential to each read contact 89. If the first card was properly punched, when the memory 79 passes a signal to punch solenoid 74 at 640 and through back contact ZXCR to verify relay coil **75*a* at 643, the reader contacts 89 and 90 encounter the punched hole in the first card and complete a circuit on lead 93 to verify relay coil 75*b* at 643**. The coils cancel each other and thereby verify the punched card against the memory.

The next punch card stepping sequence is initiated during the terminal portion of the final card punching cycle. Hence when relay XA8 is energized, relay YA1 is energized. This drops relay PVCRA at 551, and through contacts YA1 and ZB2 at 542 pulls relay A2TCR2 to close its contact at 643 and couple the even memory matrix to the punch-verify circuits. Relay PVCRB at 552 pulls as contact YA1 at 552 closes and relay ZXCR at 554 closes when contact YA1 at 554 closes. Closure of contact A2TCR2 at 353 energizes even punch isolation relay EPCR at 355 to close its contact at 643. The circuit from even memory 79 is provided from lead 81 through contacts A2TCR2 and EPCR at 643 and contact PVCRB at 642 to punch solenoid 74 at 640 and is isolated from the verify relay coil **75*a* by open back contact PVCRB at 643**.

Relays EPCR and OPCR are energized by the transfer control relay for the A2 panels for any even or odd station respectively and are held by back contact YA8 or XA8 at 349 and 350 through all card punch cycles of their respective group. As seen in FIG. 7 they prevent sneak circuits between the odd and even memories for a given digit. Thus, when an odd digit is being punched, signals from lead 84, otherwise available to lead 81 through contacts A2TCR1, OPCR and PVCRA at 640 and, after the first card punch cycle, through back contacts ZXCR at 642 and PVCRB at 643 and contact A2TCR2 at 643, are blocked by the open even punch isolation relay contact EPCR at 643. Conversely in the second and subsequent card cycles for the even stations odd punch isolation relay contact OPCR at 640 decouples lead 84.

The fourth card cycle advances the third card to the reader for varification. The fourth card is the first employee card of three for station H1. At this time back contact YB1 at 554 is open and relay ZXCR has dropped to close its back contact at 642. Thus, the punch signal to coil 74 is also passed to coil **75*a* for verification against the card signal in coil 75*b*** for the third card. The fifth and sixth card cycles occur with relays A2TCR2, EPCR and PVCRB energized; hence the fourth and fifth cards are also verified at the time the succeeding card is punched.

At the time the card punch is responding to the information stored in the fourteen matrices corresponding to odd matrix 79 and storing the fourteen digits derived from registers 31, 32, 33 and 34, it is also punching digit values as set in the tap switches. In punching the first card those digits include the production information of the tap switches on panels AA1, A2 and calendar control (not shown) which is responsive to the pull of calendar/shift punch relay CLCR at 357. This relay responds to both the first and second calendar control relays CLCR1 and CLCR2 through contacts at 357 and 358 when the calendar/shift switch at 357 is "on." Calendar and shift values may be set either manually in tap switches or automatically, as by a clock controlled, multi-tap, stepping switch. Both the calendar/shift signals and the remaining tap switch set signals are derived from the emitter digit value buses connected to contacts 77 of FIG. 7 in the sequence determined by scanning contact 76. These signals are set up as by tap switches 80 and are connected to punch solenoids as 74 and verify relay coils as 75*a* through circuits corresponding to those at lines 640 to 643 except that no punch isolation contacts OPCR and EPCR are employed. Thus the calendar/shift digits and the tap switch set digits are punched for the production control records in a sequence corresponding to that for the punches from the memory 79.

The employee information derived from the BB1 panels is controlled in a somewhat different manner. This is required because selection between several BB1 panels must be available during the read-transfer of a given work station so that a plurality of cards with different employee information can be punched for the station. In order to illustrate this selection process consider the punch and verify operation for the first even work station H1, particularly the first, second and third employee cards punched in card cycles 4, 5 and 6 of FIG. 5. The even punch card stepping sequence of the YA and YB relay series and relays ZA2 and ZB2 of the work station stepping sequence are effective at this time. Transfer control relay A2TCR2 is energized as is even punch-verify relay PVCRB. The first employee card cycle occurs while relay YA2 is pulled. This closes a contact at 563 to energize the punch-verify relay for the first employee panel BB1PVCR1 which closes its contact at 584 to pull first employee panel, transfer control relay H1–BB1–TCR1 at 590 through contact A2TCR2 at 593. Contacts H1–BB1–TCR1 and BB1PVCR1 at 644 close to connect lead 86 from tap switch 80 of the first BB1 panel of station H1 to the punch solenoid 74 at 644 for the corresponding digit. In the example the switch is set at digit "8"; hence, when scanning contact 76 of the emitter engages contach 77 for digit "8" a signal is passed over lead 85 and switch 80 to lead 86 and solenoid 74.

In the following card cycle relay YA3 is pulled to open its back contact at 563 and drop relay BB1PVCR1. This opens contact BB1PVCR1 at 644 to disconnect lead 86 from solenoid 74 and closes back contact BB1PVCR1 at 645 to connect verify coil 75*a* at 645 to lead 86. At this time, open contact BB1PVCR1 at 584 has no effect since a seal at 590 through back contact YB3 at 582 holds relay H1–BB1–TCR1. Relay 107 at 504 is energized at this time and a circuit through contacts 107, YA3 and YA4 pulls relay BB1PVCR2 to close its contact at 588 to pull relay H1–BB1–TCR2 at 593. This couples switch 80 connected to lead 87 of the second BB1 panel for station H1 and representing the same digit as represented by switch 80 for the first panel, to solenoid 74 at 644 through contacts H1–BB1–TCR2 and BB1PVCR2 at 646. Open contact BB1PVCR1 at 644 and open back contact BB1PVCR2 at 647 isolate lead 86 from lead 87. As the first employee card advances through the card reader, its contacts 89 and 90 for the fortieth digit are permitted to engage at digit value "8." At that time the emitter has actuated the value "8" through switch 80 and lead 86 via contacts H1–BB1–TCR1 at 644 and BB1PVCR1 back contact at 645 to coil 75*a* at 645 to cancel the flux in coil 75*b* at 655 from the signal on lead 94. This digit of the first employee card is thereby verified against its signal source. During this cycle, the second card has its fortieth digit punched with the value "6" as set on switch 80 for the second BB1 panel. This is also controlled by the emitter such that engagement of scanning contact 76 with digit value contact 77 for value "6" pass a signal to lead 87 and through contacts H1–BB1–TCR2 and BB1PVCR2 at 646 to punch solenoid 74 at 644.

The terminal portion of the second employee card cycle results in energization of relay YB3 to open its back contact at 582 and open the verify circuit for the first employee card by the drop of the first BB1 panel transfer control relay H1–BB1–TCR1. This opens the contact at 644 to disconnect lead 86 from the punch-verify controls.

The third employee card punch cycle occurs while relay YA4 is energized. Back contact YA4 opens at 565 to drop relay BB1PVCR2 thereby opening the punch connection from lead 87 to solenoid 74 at 646 and closing the verify connection from lead 87 to coil 75*a* at 647. Back contact YB4 at 586 holds a seal around contact BB1PVCR2 at 588 for relay H1–BB1–TCR2 for the verify cycle of the second employee card. The punch connection for the third card is completed by contact YA4 at 567 pulling relay BB1PVCR3 to close a contact at 591 and pull relay H1–BB1–TCR3 at 596. This provides a path from lead 88 from the fortieth digit tap switch 80 of the third BB1 panel of station H1 through contacts H1–BB1–TCR3 and BB1PVCR3 at 648 to solenoid 74.

At the termination of the third employee card punch cycle relay YB4 pulls to open back contact YB4 at 586 and drop relay H1–BB1–TCR2. Contact YB4 at 381 passes current to relay YA5 at 382 and lead 245 when contact RCR at 361 closes during the final portion of the third employee card punch cycle, since contact A2TCR2 for station H1 at 386 is closed to bus 248 and bus 243 relay YA8 is also pulled at this time. Back contact YA8 at 363 conditions the reset of the even punch card stepping sequence so that at the termination of the next card cycle the opening of contact RCR at 361 will reset all relays of the sequence.

During the card cycle following the punching of the third employee card that card is verified since the transfer control relays are held and the punch-verify relays are dropped. Relay A2TCR2 is held by contact YA1 at 542. Relay H1–BB1–TCR3 is held by back contact YB5 at 589. Punch-verify relay PVCRB is dropped by open back contact YA8 at 552 while relay BB1PVCR3 is dropped by open back contact YA5 at 567. Thus, lead 88 from tap switch 80 is coupled to verification relay coil 75*a* at 645 through back contact BB1PVCR3 at 649 and contact H1–BB1TCR3 at 648 while lead 81 is coupled to verify coil 75*a* at 643 through back contact PVCRB at 643 and through contacts EPCR and A2TCR2 at 643.

At the end of the card cycle in which the final card is verified, contact RCR at 361 is opened to reset the punch card stepping sequence, thereby opening contact YA1 at 542 to reset relay A2TCR2. This opens contact A2TCR2 at 593 to drop relay H1–BB1–TCR3 and contact A2TCR2 at 353 to drop relays CLCR2, EPCR and CLCR.

*Reset operations*

In the previous discussion certain sequencing functions in the sequencing circuits and the transfer control relay circuits which are dependent upon the operation of controls in FIG. 15 have been assumed. These circuits will now be considered. FIG. 15 is supplied with voltage from FIGS. 13 and 14 by buses 201 and 264. Relays ZCR1 and ZCR2 at 491 and 493 open the supply to the driver (by means not shown) to reset the logic of that circuit when associated with the odd and even station groups respectively. The memory, made up of two groups of fourteen matrices each of the type shown in FIG. 6, are reset, as indicated in FIG. 5 following the final verification of a card punched with information from the memory group. Relays M1CR and M2CR at 494 and 496 control (by means not shown) the circuit (not shown) holding the energized memory relays of the odd and even groups respectively so that those memories are established when the driver begins its read out and are held until the verification of the final card has been achieved. Relays 103 to 106 at 498 to 502 enter into the sequencing of the memory reset relays by relating their operation to the termination of the punch card stepping sequences of FIGS. 10, 11 and 12. Relay 107 at 504 aids in sequencing the odd-even flip-flop control of relays F1CR, F2CR and F3CR at 506, 510 and 512 respectively so that those relays relate the transfer of work station stepping sequence of FIGS. 13 and 14, the AA1 panel transfer control relays of FIG. 16, and the memory reset to the operation of the card punch through master clocking relay RCR at 341 and flip-flop transfer relay XFR at 508. Relay F1CR also starts the driver by operating relay XCR at 341 at appropriate instants in the read-transfer operation to memorize information from registers of the AA1 panels. Relays ZO1, ZO2 and ZO3 at 513, 514 and 516 respectively control the sequencing of the zero set controls in response to the punch card sequence controls of FIGS. 10, 11 and 12 so that circuits are reset upon completion of the second card cycle for a station under ordinary circumstances. These relays control zero set relay VCR at 343, the driver reset, and the AA1 panel transfer control relays of FIG. 16.

First flip-flop control relay F1CR at 506 is controlled by the card punch cycling through master clocking relay RCR and its contact at 506. Relay F1CR is energized only during the second card cycle of each punch card stepping sequence since contact XB1 at 506 or YB1 at 507 is closed at the 9.2 punch interval of the first cycle for the odd and even sequences respectively, contact RCR is closed at the 9.7 punch interval, and back contact XB2 at 506 or YB2 at 507 is opened at the 9.2 punch interval of the second cycle for the odd and even sequences.

Back contact F1CR at 341 maintains driver start relay XCR energized during all but the second card cycle of each punch card sequence. The driver is started for memorizing counts accumulated in a group of registers for an AA1 panel by the deenergization of relay XCR (by means not shown). Thus as noted above in initiating a read-transfer operation, the zero card cycle of FIG. 5 in which the first memory occurs follows the interval of relay XA1 in which a blank card is issued, and the initial memory cycle for the odd group occurs during the card cycle of the interval of relay XA2 in which a second blank card is issued. In subsequent card punch sequences the memory opposed to that from which punch information is being derived is operated during the second card cycle for a station. When back contact F1CR at 341 opens, the drop of relay XCR is delayed by capacitance 271 to insure that the transfer control relays for the AA1 panel have completed the connection of the memory driver and panel before the driver begins its read out of the registers in the panel. Thus the second punch cycle for the first station of FIG. 5, card cycle 2, is the memory cycle for the second station; the second cycle for the second station, card cycle 4, is the memory cycle for the third station; and the second cycle for the third station, card cycle 8, is the memory cycle for the fourth station. Accordingly, blank card producing cycles are avoided so long as successive stations are alternately in the odd and even groups. If the stations skipped in the programming are such that successive stations are of the same group, two blanks cards will issue during the punch card sequencing of the opposite group required to clear the memory for the stations and memorize information into that memory from the next station in that group. Back contact F1CR at 493 opens without effect on the initial card punch sequence.

Front contact F1CR at 494 closes with contact XFR, as will be discussed, to energize memory reset relay M1CR and couple the energizing means for the relay coils of the memory matrices to the odd memory. This coupling is retained by relay M1CR until it is deenergized at the end of the verification of the last card in the next punch card sequence. Contact F1CR at 496 has no effect during the first sequence. On subsequent sequences that contact energizes relay M2CR to couple the even memory relays of the matrices to their energizing means until the verification of the last card in the next even punch card sequence.

Contact F1CR at 504 closes without effect at this time.

Contact F1CR at 508 closes to energize transfer relay XFR which seals itself at 509. This establishes the advancing circuits for the station stepping sequence and the energizing circuits for the transfer control relays of panel AA1. Back contact F1CR opens at 510 to make the closure of contact XFR in circuit with relay F2CR ineffective at this time. Relay F2CR is energized on the drop of relay F1CR near the end of the second card cycle. Contact F1CR at 512 closes without effect until relay F2CR is energized.

Relay M1CR at 494 closes a seal at 495 and by closing contact M1CR at 498 to lead 286 enables sequencing circuits for its reset by means of relays 103 and 105 which are effective at the end of the next odd punch card stepping sequence. It will be recalled that the read-transfer operation initiated with the even punch card stepping sequence relays of the YA and YB series. Hence relay F1CR is actuated initially in response to closure of contact YB1 at 507 and the sequence is concluded with operation of relay YA8 without effect upon relays 103 to 106. In the second or odd punch card stepping sequence relay F1CR is energized by closure of contact XB1 at 506. Relay M1CR remained sealed and at the end of that sequence relay XA8 is energized to close contact XA8 at 498 and open back contact XA8 at 502. This energized relay 103 at 498 which seals itself at 499 and closes a contact at 502 without effect until the last odd card punched has been verified and the XA series of relays dropped to close back contact XA8 at 502. This closure energizes relay 105 which opens its back contact at 494 and drops relay M1CR whereby the memory for the odd stations is deenergized and reset.

Upon the second energization of relay F1CR, at a time when relay F2CR is energized, during the second card cycle of the odd sequence, relay M2CR is energized by the simultaneously closed contacts F2CR and F1CR at 496. This connects the even memory matrices to their energizing source, seals itself by contact M2CR at 497 and prepares the even memory reset sequence of relays 104 and 106 by closing contact M2CR at 500 to lead 287.

Simultaneous energization of relays F1CR and F2CR during the second card cycle of any read-transfer operation also energizes relay 107 at 504 to seal itself at 505 for the remainder of the operation. Relay 107 insures proper synchronization of the odd-even circuitry at the initiation of each read-transfer program by maintaining contacts at 512 and 565 open until the second card cycle of the second punch card stepping sequence. Open contact 107 at 512 avoids a premature pull-in of relay F3CR and thus a premature drop of transfer relay XFR which might result in improper synchronization. Open contact 107 at 565 avoids the pull-in of the punch verify relay BB1PVCR2 at a time when no card which has been punched has been advanced to the verifier. If this connection were not avoided signals would be issued to one coil of each verify relay and the interlock of the verifier would be actuated to stop the operation of the card punch and thus the entire system.

When relay 107 is pulled, the relay F3CR is thereafter responsive to operation of relays F1CR and F2CR while relay BB1PVCR2 is responsive to normal sequencing by the contacts of the XA and YA relay series. The pull of relay F1CR in the second card cycle of the second sequence, in conjunction with the energized F2CR relay and 107 relay energizes third flip-flop control relay F3CR at 512 through contacts F1CR, 107 and F2CR at 512. Relay F3CR seals at 511 around contact F2CR and shunts relay XFR to cause it to drop thereby setting the even station controls.

Relay XFR is thus energized from the end of the first card cycle of an even punch card stepping sequence to the end of the first card cycle of an odd punch card stepping sequence and deenergized the remainder of the time. Its energization closes contacts XFR at 442 and 521 to enable those ZB and AA1 transfer control relays associated with odd work stations and opens back contact XFR at 443 and 525 to disable the pull-in circuits for those ZB and AA1 transfer control relays associated with even work stations. Thus, the odd ZB and AA1 transfer control relay circuits are partially completed during the second and subsequent even punch card sequences and the first odd punch card sequence, while the even ZB relay circuits are partially completed at all other times. These ZB relays have contacts cooperating with contacts of XFR to control the transfer control relays of the AA1 panels and cooperating with the punch card stepping contacts XA1 at 541 and YA1 at 542 to control the transfer control relays of A2 panels.

Flip flop transfer relay XFR controls the initial energization of the work station stepping sequence relays which is employed to energize the proper transfer control relay for memorizing the values set in the registers of the AA1 panel.

Reconsidering FIG. 13, when contacts YB1, YB2 and RCR are closed at 442 and 443 and at 506 and 507 for the second card cycle, relay ZA1 is pulled through isolating diodes 263 and 260 to close contact ZA1 at 446. Since relay F1CR at 506 pulls relay XFR at 508 for the second and succeeding even sequence card cycles the contact at 442 is closed and relay ZB1 at 446 is conditioned to pull upon the termination of the second card cycle and the opening of the shunt across its coil through contact RCR. Upon the pull of the relay ZA1, its contact at 521 closed as did contact XFR at 521 to pull relay AA1TCR1. Relay AA1TCR1 couples the memory, driver and registers of the AA1 panel to enable those registers to read into the memory during that second card cycle.

The termination of the second card cycle pulls relay ZB1 which remains energized until the end of the read-transfer program. Relay ZB1 opens its back contact at 447 to remove the lockout which otherwise would be effective as RCR closed, and closes a seal at 447 around contact XFR at 442. It closes contact ZB1 at 448 to condition a circuit to pull relay ZA2 through contacts XB1 and XB2 at 441 during the second card cycle of the next punch card stepping sequence. Relay ZB1 closes a contact at 541 with no effect on relay A2TCR1 since contact XA1 at 541 is open. Back contact ZB1 at 521 opens and drops relay AA1TCR1 to disconnect the memory, driver and registers.

As the odd punch card stepping sequence begins and relay XA1 pulls to close its contact at 541, relay A2TCR1 pulls through contacts XA1, ZB1, ZB3 and PB1 at 541. Relay A2TCR1 seals at 541 around contact PB1 since the closure of contact A2TCR1 at 304 drops relay PB1 by shunting its coil at 275 and sealing relay PC1 at 302. Back contact PB1 at 445 closes without immediate effect since blocking rectifiers 260 prevent the energization of ZA relays subsequent to ZA1 through lead 273. The closing of contacts A2TCR1 in FIG. 16 between bus 202 and bus 289 and between bus 290 and the coil of AA1TCR1 has no effect at this time. The paths offered by these contacts are employed later to recouple the driver, contacts of the relay matrix and the registers in order to reset the registers to zero.

Relays ZO2 and ZO3 control the coupling of the registers and the actuation of the driver for resetting the registers. The conditions for resetting the registers require relay ZO2 energized and ZO3 deenergized. This occurs only between the second and third card cycles following the initiation of a card punch sequence. Relay ZO1 at 513 pulls at the end of the second cycle in each sequence, at the 9.7 portion of the cycle as contact RCR at 513 closes, and is intermittently denergized between the 9.2 and 9.7 portion of each card cycle of the sequence by contact RCR. Relay ZO1 pulls relay ZO2 by closing contact ZO1 at 515. Relay ZO2 seals itself throughout the interval contact XB2 or YB2 remains energized, i.e. for the remainder of the punch card stepping sequence. At the 9.2 instant of the third card cycle contact RCR opens to drop ZO1 and close its back contact at 516. This pulls relay ZO3 to terminate the register reset.

When the second card cycle of the odd punch card stepping sequence approaches its termination and drops relay RCR, relay XB2 pulls. At this time relay XFR is dropped and back contacts XFR at 443 and 523 are closed while front contacts XFR at 442 and 521 are open. The inhibiting shunt across coil ZB2 in FIG. 13 is opened and the relay pulls through contact ZA2 at 450 and back contact XFR at 443. Contact XB2 at 522 closes without immediate effect since contact ZO2 at 522 is open. Contact ZO2 at 522 closes as master clocking relay is reenergized to close contact RCR at 513. Contact ZO2 at 522 closes to energize lead 290 during the third card cycle of the odd punch card stepping sequence whereby the driver, odd AA1 panel and odd memory are reconnected to enable the reset of the registers of the odd panel from the values in the odd memory as shown for the third and ninth card cycles of the read-transfer sequence of FIG. 5. This reconnection is effective to reenergize relay AA1TCR1 through its contacts at 522 to lead 290 and lead 202.

The driver common supply to its logic circuits is provided with a normally closed contact (not shown) of relay ZCR1 and its actuating circuit for initiating the issuance of a register resetting pulse train is a back contact (not shown) of relay VCR. As shown in FIG. 9 relay VCR is normally energized through back contact ZO2 at 343 and can be dropped to issue a start only in response to the energization of relay BO2. Relay ZCF1 at 491 of FIG. 15 is normally deenergized; hence the driver logic is normally energized. Relay ZO2 opens its back contact at 343 to drop relay VCR and start the register reset pulse train applied by the driver through the closed contacts of the AA1TCR for the panel. Contact ZO2 at 491 closes to energize relay ZCR2 through now closed back contact VCR at 492. Contact VCR at 491 is open at this time. Contact ZO2 at 514 seals relay ZO2.

At the end of the second card cycle contact RCR at 513 is again opened to drop relay ZO1. Relay ZO2 maintains its seal and closed back contact ZO1 at 516 completes a circuit with contact ZO2 for relay ZO3. Relay ZO3 seals at 517. It reenergizes relay VCR by closing contact ZO3 at 344 thereby opening the reset pulse train initiating circuit. Back contacts ZO3 at 522 and 524 open to interrupt the energizing circuits for the transfer control relays for the odd and even station AA1 panels, respectively. This disconnects the driver, memory and registers.

When relay VCR is reenergized it opens back contact VCR at 492 without effect since relay ZCR2 is sealed around that contact through back contact F1CR at 493. It also closes front contact VCR at 491 to pull relay ZCR1 through contacts ZO2 at 491 and ZCR2 at 490. Relay KCR at 337 is energized at this time and until the read-transfer sequence is completed and relay JCR at 333 is dropped. Therefore the relay ZCR1 has an energizing path through contact KCR at 491 throughout the remainder of the punch card stepping sequence. As noted, ZCR1 when energized, opens the supply to the driver to reset its logic. Thus the driver logic is reset from the end of the third card cycle following a punch card stepping sequence initiation until termination of that sequence.

*Termination of sequence*

The read-transfer of stations proceeds in the pattern outlined in FIG. 5 and set forth above until the last station, that of highest rank, with a pulled PB relay is introduced into the read-transfer operation. In the second card cycle of the punch card stepping sequence preceding that for the last station the registers of the AA1 panel for the last station are coupled to the driver and memory matrix group for its family of stations, and the driver is set in its read mode of operation. At this time, assuming the next station preceding the last station is not skipped, all PB relays but that for the last station have been reset and all PC relays but those for the next to the last and last station have been reset.

In the third card cycle for the next to last station, its registers are reset by reenergizing its AA1 transfer control relay and actuating the driver to a reset mode of operation so that resetting pulses are applied to the solenoids of its registers to return them to zero settings. The driver logic is then reset.

At the termination of the final card cycle for the next to last station in which a card for that station is punched, the stepping sequence relay YA8 or XA8 is energized to prepare a reset of the sequence relay family at the end of the following card cycle and the A2 transfer control relay for the last station is pulled so that in the following card cycle the first card of the last station is punched and the last card of the next to last station is verified.

The pull of the A2 transfer control relay for the last station resets the station's PB relay so that no PB relays remain energized. The drop of the A2 transfer control relay for the next to the last station drops the PC relay for that station so that the only PC relay remaining energized is that for the last station. These circuits are controlled as illustrated in FIG. 8.

When the second card cycle for the last station occurs, the system actuates the driver to generate a memorizing or register reading pulse train as in each preceding punch card stepping sequence. However, this results in a dry run of the driver since no subsequent station has been made available to couple the registers of an AA1 panel to a memory group.

During the third card cycle for the last station, the registers for the last station are reset and at the termination of that cycle the logic of the driver is reset. The driver logic remains reset until the next read-transfer operation is initiated. At this time all registers programmed for read-transfer have been read into the memory groups for the families to which their stations have been assigned and have been reset to zero. Further the registers have been released to accept further information in the form of counts from their respective work stations as their PC relays were dropped following completion of their read-transfer operations.

When the final card is punched for the last work station, the final verify card cycle follows with relay YA8 or XA8 energized to condition the punch card stepping sequence for resetting. As in the case of the initial card cycles of a read-transfer program and in the case of skipped work stations where successive stations are in an irregular order, the card punch machine operation provides the final clocking impulses for the system. Accordingly, during the verification of the last card punched, a card is advanced through the machine and issues as a blank therefrom.

Figure 19:
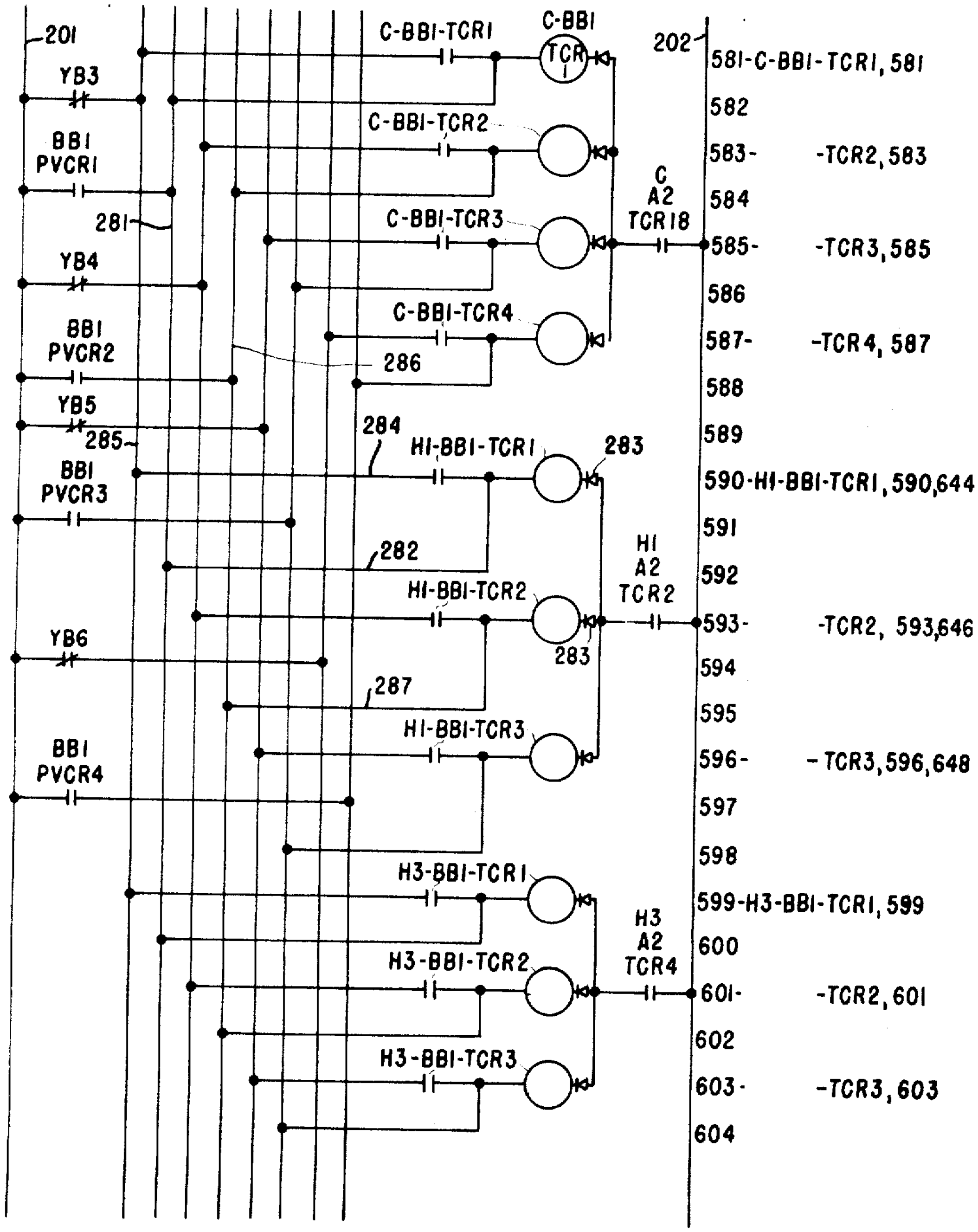
FIG. 19 and 20 are across the line diagrams of the transfer controls for the BB1 panels of typical even and odd work stations, respectively.

At the termination of the final verification card cycle the punch card stepping sequence for the last station is reset. This drops the A2 transfer control relay for the last station thereby leaving all the circuits of FIG. 17 reset. With all A2 transfer control relays reset the BB1 transfer control relay circuits of FIGS. 19 and 20 are all reset as are the calendar control and punch isolation relay circuits at 349 to 358. The opening of the holding circuit for the last station's PC relay provided by the A2 transfer control relay drops that relay to eliminate the final hold circuit for master record start relay JCR at 333 and drop that relay. This resets the sequence initiation relay KCR at 337, the punch card stepping sequence circuits of FIGS. 10, 11 and 12 at 361, and the work station stepping sequence circuits of FIGS. 13 and 14 at 440. The drop of relay JCR also stops the card punch machine (by means not shown) to thereby open the supply to master clocking relay RCR at 339. Since the work station stepping sequence and the punch card stepping sequence relays are all reset the AA1 transfer control relays of FIG. 16 are all reset as are all BB1 punch-verify relays of FIG. 18. The sequencing controls of FIG. 15 are supplied from lead 264 of FIG. 13; hence these circuits are also reset by the drop of relay JCR.

*Manual sequence*

Individual work stations can be subjected to the read transfer operation independently of the clock programmed operation described. Actuation of an individual read-transfer is accomplished by manually depressing switch 46 shown on the AA1 panel and in the circuit of the PB relays of FIG. 8. The sequence involves closing the switch 46, for example for the fourth station, at 320 to energize PB4 from bus 202 through resistor 209 and switch 46 to back contacts ZB26 and PB26 at 311 and lead 201. Relay PB4 closes a contact (not shown) to energize master record start relay JCR at 333, seals itself by contact PB4 at 321, partially enables relay PC4 at 317, opens the skip circuit for the work station stepping sequence at 457, and partially enables the energizing circuit for transfer control relay A2TCR4 by contact PB4 at 544. Relay JCR starts relay RCR at 337, enables the punch card stepping sequence at 361, and enables the work station stepping sequence at 440.

The even punch card stepping sequence runs to pull YA1 at 362 and issue a blank card. Relay YB1 pulls at 364 to enable the work station stepping sequence through contacts YB1 and YB2 at 442. When contact RCR at 443 closes, the circuit is completed through contacts PB1 at 445, PB2 at 449, and PB3 at 453 so that relays ZA1 at 444, ZA2 at 448, ZA3 at 452 and ZA4 at 456 are all energized. Open back contacts ZA2 at 521, ZA3 at 523 and ZA4 at 525 lock out relays AA1TCR1, AA1TCR2 and AA1TCR3, while closed contact ZA4 at 527 partially enables relay AA1TCR4.

At the end of the first card cycle when relay YB1 pulls and after master clocking relay RCR pulls, first flip flop control relay F1CR at 506 pulls to energize relay XFR. This pulls odd memory reset relay M1CR at 494 by contacts XFR and F1CR and starts the driver pulse train generation for reading the registers by dropping relay XCR at 341. Since XFR back contacts at 443 and 523 are open at this time, the pulse train has no effect since no transfer control relays for the AA1 panels are energized and a second blank card is issued from the card punch.

At the end of the second card cycle relay YB2 pulls to drop relay F1CR by back contact YB2 at 506 and when contact RCR at 513 closes to pull relays ZO1 and ZO2. Relay ZO2 causes relay VCR at 343 to drop and a zero set signal train to be issued by the driver without effect since no registers are coupled through transfer control relays of an AA1 panel. Since no calendar control relay is pulled and back contact CLCR2 at 376 in the skip circuit for even punch card stepping sequence is closed, the sequence is terminated and odd punch card stepping sequence is initiated by energizing relay XA1.

The reset of the relay YB2 at the end of the third card cycle dropped relays ZO1 and ZO2. The pull of relay XA1 causes another blank card to issue since no odd station is coupled to the card punch emitter. At the end of the third card cycle XB1 pulls to close a contact at 506 and as contact RCR is closed energize relay F1CR. Relay F2CR had pulled previously when YB2 back contact at 507 opened to drop F1CR and close back contact F1CR at 510. Hence the closure of contacts F1CR at 496, 504 and 512 with closed contacts F2CR at those locations pull relays M2CR, 107 and F3CR during the fourth card cycle. Relay M2CR couples a source to the relays of the even memory matrices. The shunt by contact F3CR at 509 drops relay XFR and the back contacts XFR at 443 and 523 closed to enable relay ZB4 and pull relay AA1TCR4 through closed contacts ZA4, ZB4 and ZA5, lead 291 and back contact XFR. This couples the memory and the driver with the registers of station H3 so that a read pulse train from the driver will set the memory matrices with the digit values in the registers. Relay F1CR again opens its back contact at 341 to drop relay XCR thereby actuating the driver to issue a read pulse train to the now coupled registers of station H3 and to set the even memory matrices.

Closed contact M2CR prepares the sequencing of relays 104 and 106 for an even sequence memory reset. In the preceding dry run of the even punch card stepping sequence relay M1CR pulled at 494. The odd punch card stepping sequence pulled relay 103 upon the pull of XA8 to close its contact at 498. When the odd sequence was reset relay 105 at 502 pulled to drop relay M1CR at 494 and issue a dry run reset of the odd memory.

The fifth card cycle causes a punching operation according to the values in the memory and tap switches of panels AA1, A2 and the calander/shift. Relay XA1 is pulled during this cycle and at its termination relay XB1 pulls. This pulls relay F1CR at 506 so that during the sixth card cycle a second card is punched for the manually selected station and the system hunts another station in the odd family by pulling relay XFR at 508. Assuming no odd family station has been selected by operation of its read-transfer switch 46, no PB relay for an odd station is pulled and no ZA or ZB relay of FIGS. 13 and 14 for an odd station is pulled. Accordingly, the drop of relay XCR by the opening of back contact F1CR at 341 results in another dry run register read train from the driver.

If no other even stations are manually programmed for read-transfer at the conclusion of the verification cycle for the last card of station H3, relay PC4 is dropped to break the seal for relay JCR at 333 and reset the entire system as described above.

The special panels represented by relays PB26, AA1ATCR, A2ATCR and BB1TCR can only be manually programmed. The programming sequence is as outlined above since that station is assigned to the even family of stations. Their read-transfer is initiated by closing switch 270 at 345 to energize relay PB26 at 346. This can be operated only when no other station is programmed for read-transfer as indicated by closed back contact ZA1 at 348. The special panels can issue but one card; hence the second card sequence relay XA2 resets the special panel relays by opening back contact XA2 at 348.

The special panel read-transfer operation requires no read, memory, or reset functions by the driver since all of its panels AA1A, A2A and BB1 (not shown) supply information from tap switches only. Thus the punch operation is performed in the first card cycle and the transfer control relays for those panels AA1ATCR, A2ATCR and BB1TCR are energized at 347, 348 and 349 only during the first card cycle of a punch card stepping sequence by closure of contact YA1 at 348. As in the case of the A2 and BB1 series of transfer control relays for the regular work stations, the information sources of the special panels, the tap switches, are connected to the card punch emitter only while the transfer control relays AA1ATCR, A2ATCR and BB1TCR are energized. The switch at 349 in circuit with relay BB1TCR selectively enables that relay during the operation of AA1ATCR and A2ATCR.

*Summary*

In the embodiment illustrated, a number of information sources supply information to a recording device in the form of a commercial card punch. The information sources employed are multiposition tap switches or manually preset sources, and solenoid actuated registers or accumulating sources. These information sources are grouped into sets to represent work stations or machines in a factory and the employees assigned thereto. Thus an AA1 panel has a number of production information sources of the preset and accumulating type while the A2 panel have only preset sources of production information and the one or more BB1 panels have preset sources of employee information.

The several sets of information sources are grouped in families, particularly an odd family and an even family. This enables an overlap of the information storage, recording, verifying and resetting functions to expedite the operation of the system. A memory means, in the form of fourteen groups of four relays each for the fourteen registers of the example, is provided for each family and designates an odd memory and an even memory.

These memories are sequenced alternately in the overlapping functions of the system. Work station or information source group selection is provided in a manner to enable selection of first an odd and then an even set of information sources and to couple the selected set to its respective odd or even memory means. Means is actuated in conjunction with the coupling of a set of registers to a memory to read the information in the registers into the memory whereby it is stored for utilization by the recording apparatus. This reading means is a pulse generator which cooperates with a binary counter and marking signals from the registers as they attain a predetermined count, nine in the example, to set in binary code the memory relays for each digit represented by the registers.

The relays each establish paths through a matrix of contacts for passing a signal to the recorder through one of ten output terminals and for passing groups of reset pulses to the solenoids of the registers so that they are driven to a reset position, usually the zero setting as established by a train which is the complement of their count. The driver, a pulse generator, provides both the reading and resetting pulse trains and is selectively and alternately coupled to the memory and registers of one family for storing information from the currently selected station of that family, and to the memory contacts and register solenoids of the opposite family for the currently selected station of that family for resetting its solenoids.

Sequencing of the system functions is accomplished by clocking means which in the example is a cam actuated contact on the card punch machine and accordingly is coincident with the definition of the recording intervals of the machine. Generally the sequencing involves, in the first clocking interval, selecting a work station and storing in the memory for that family of stations the information accumulated in the production registers of that station. In a second clocking interval the stored information and that which was preset is recorded while the registers for the opposite family, if coupled to the driver and memory, are reset. Such register reset follows the storage cycle for the memories of its counterpart throughout all subsequent cycles. The third clocking interval, may, if selection and programming controls are set appropriately, record the same information as was recorded in the second interval supplemented by preset employee information. Also during this third interval and in all clocking intervals following a recording operation the previously recorded information is verified by reading it against the information sources which supplied the recorder. In the example the values in the tap switches and memory matrices are compared with the values punch in the card for verification of the punched card.

The memory of the family opposite that subject to recording is coupled to a selected set of information sources and the driver during the clocking interval following the first recording interval for a work station. Thus, during the interval following the recording of an odd work station a selected even work station has its registers read and their information stored. Conversely in the clocking interval following the first recording of an even work station the next selected odd work station is coupled to the odd memory and its register counts stored.

Following the verification of the last record made for a work station, the memory employed in that recording and verifying operation is reset to make it available for another work station of the family. This reset and the final verification occur while the first recording operation for the next station is accomplished. Accordingly the cycle is completed and a new storing of the information from a newly selected station occurs in the clocking interval following the first recording for the currently recorded station. For example if an even station is being recorded and the odd memory is reset in the first even station recording interval, in the next clocking interval a newly selected odd station is coupled to the odd memory and its register counts stored.

The above sequences are repeated, shifting between the odd and even stations and memories as indicated until the last station information has been stored, recorded and verified. Thereafter the system is reset to await another read-transfer sequence.

In the operation of the system as taught above, both production and payroll cards can be produced for programmed stations. This involves recording both register and tap switch information for the production at the station a multiplicity of times and selectively coupling employee identifying tap switches for recording and verification intervals. The recording and verifying functions for different combinations of information overlap and while common sources of information are utilized simultaneously for both functions, where necessary, they are provided with isolating means.

From the above it is evident that the system lends itself to the substitution of many equivalents and to many modifications. For example, the information sources, the storage means, the resetting means, and the recording means can be replaced by alternative forms of devices. The concept of multiple storage and overlapping storage and recording can be expanded as with three families of work stations and three memory means. Accordingly, it is to be appreciated that the present embodiment is presented as illustrative and not in a limiting sense.

Having described the invention, we claim:

1. A system for recording information from a plurality of sets of sources of information divided into a plurality of groups comprising a recording device, a memory means for each group, means for recording information for a set of sources for one group from said memory means for said one group, and means for storing information for a set of sources for another group in said memory means for said other group simultaneously with the operation of said recording means.

2. A system for recording information from a plurality of sets of sources of information divided into a plurality of groups of sets comprising, an information memory means for each group, a recording device, means for recording information for a set from the memory means of the group of said set, and means for resetting the sources of information for a set which has been recorded during the recording of another set.

3. A system for recording information from a plurality of sets of sources of information divided into a plurality of groups, comprising a memory means for each group, means to read selected sources of said set into said memory means for the group of said set, means to reset said selected sources to a predetermined value, means for recording information from said sources and said corresponding memories, means to actuate said reading means for one group during the recording of information for said other group, and means to actuate said reset means for a group which has been recorded during the recording of information for another group.

4. A system for recording information from a plurality of sets of sources of information assigned to odd and even groups of sets comprising, an odd and an even information memory means, a recording device, means for selectively coupling one of said memory means to said recording device, means for selectively coupling one of said sets of a given group to said memory means for that group, means for recording the information stored in one memory means while storing information in said other memory means.

5. A system for recording information from a plurality of sets of sources of information assigned to odd and even groups of sets comprising, an odd and an even information memory means, a recording device, means for selectively coupling one of said memory means to said recording device, means for selectively coupling one of said sets of a given group to said memory means for that group, means for repetitively recording the information stored from alternately one memory and then said other memory, and means for repetitively storing information in alternately the odd and even memories during the recording from respectively said even and odd memories.

6. A system for recording information from a plurality of sets of sources of information assigned to odd and even groups of sets comprising, an odd and an even information memory means a recording device, means for alternately coupling said odd and said even memory means to said recording device, means for selectively and individually coupling each of said sets of sources of information to said memory means of the group for said set, means for recording the information stored in one memory means while storing information in said other memory means.

7. A system for recording information from a plurality of sets of sources of information assigned to odd and even groups of sets comprising, an odd and an even information memory means, a recording device, means for alternately coupling said odd and said even memory means to said recording device, programing means for selectively coupling individual sets of a plurality of said sets of sources of information to said memory means of the group for said set, means for repetitively recording the information stored from alternately one memory and then said other memory, and means for repetitively storing information in alternately the odd and even memories during the recording from respectively said even and odd memories.

8. A combination according to claim 7 wherein said programing means selectively couples sets of sources of information in a predetermined order.

9. A combination according to claim 8 including means for selectively skipping a programed set of sources.

10. A system for recording information from a plurality of sets of sources of information assigned to a plurality of groups of sets comprising, an information memory means for each group, a recording device, a verifying device for comparing recorded information with a standard, means for recording information for a set of information sources from the memory means of the group of said set, means for resetting the sources of information for a set which has been recorded during operation of said recording means, and means for verifying said recorded information against that information stored in the memory means from which said information was recorded.

11. A combination according to claim 10 including resetting means for said memory means and means actuating said resetting means to reset said memory means subsequent to the operation of said verifying means.

12. A combination according to claim 10 wherein said recording means, said resetting means for said information sources, said verifying means, and said resetting means for said memory means are each operated repetitively and are effective upon different groups of sets of information sources in successive operations, and wherein successively operated memories are for different groups of sets of information sources.

13. A system for recording information from a plurality of sets of sources of information assigned to odd and even groups of sets comprising, an odd and an even information memory means, means for alternately selecting sets of sources from said odd and even groups in succession, means for coupling sets of sources selected by said selecting means to said memory means of the group of said selected set, means for storing information from a set in said memory means coupled thereto, information recording means, means for coupling said recording means to and for recording information from said memory means of the group opposite that having information stored in its memory during said storing of information, verifying means for comparing recorded information with a standard, and means for verifying said recorded information for one family against the information stored in said memory means for said group during the recording by said recording means of information stored in said memory means of the opposite group.

14. A system for recording information from a plurality of sets of sources of information assigned to odd and even groups of sets comprising, an odd and an even information memory means, means for alternately selecting sets of sources form said odd and even groups in succession, means for coupling sets of sources selected by said selecting means to said memory means of the group of said selected set, means for storing information from a set in said memory means coupled thereto, information recording means, means for coupling said recording means to and for recording information from said memory means of the group opposite that having information stored in its memory during said storing of information, verifying means for comparing recorded information with a standard, and means for verifying said recorded information for a given group against the information stored in said memory means for said group.

15. A combination according to claim 14 including means for operating said recording means repetitively while coupled to a given memory means, and means for coupling said recording means to and for recording information from said memory means of said group opposite that coupled to said verifying means during the verification of the final group of information from said given memory.

16. A combination according to claim 14 wherein said selecting means is arranged to select sets of sources in a predetermined order, and means for skipping the selection by said selecting means of a given set of sources.

17. A combination according to claim 14 including means responsive to the operation of said verifying means for resetting said memory means employed with said verifying means.

18. A combination according to claim 15 including means responsive to the verification of the final group of information from said given memory for resetting said given memory.

19. A production monitoring system comprising a plurality of information sources including information accumulators and preset information sources, means to record information from a first selected grouping of information sources including information accumulators and preset sources in a first discrete recording medium, and means to record information from a second grouping of information sources comprising information accumulators and preset sources and including certain of said first grouping of accumulators and preset sources in a second discrete recording medium.

20. A production monitoring system for a plurality of work stations for a plurality of employees comprising a plurality of information sources including information accumulators and preset information sources for each work station, a plurality of preset information sources for each employee, means for recording information in a first grouping of information sources for a first station in a first discrete recording element, and means for recording information in a second grouping of information sources including said sources for said first station and said sources for an employee in a second discrete recording element.

21. A production monitoring system as defined in claim 20 including means for recording information in a plurality of discrete recording elements from a plurality of separate preset employee sources and a common plurality of information sources for said first station.

22. A production monitoring system for a plurality of work stations comprising a set of register type production information sources for each work station, a set for preset production information sources for each work station, at least one set of preset employee information sources for each work station, means to assign certain of said work stations to a first group and other of said work stations to a second group, means for individually and successively selecting a set of register sources and sets of preset sources as work station set groupings of sources, said successive selections being made from sets in alternate groups, first and second memory means for said first and second groups respectively, means to couple said register type production information sources of a set for a selected work station group to said memory means of the group for said work station, means to read said registers into said memory means coupled thereto, means to record information stored in said memory means and said preset information sources, said recording means defining recording intervals, means to couple said memory means and said preset production information sources to said recording means during a recording interval for recording the information of said coupled sources and memory means, means to couple said memory means, said preset production information sources and a first set of said preset employee information sources to said recording means for a second recording interval to record the information in said memory and said information sources and means to repetitively cycle said system through said first and second recording intervals for work station set groupings of alternate groups.

23. A production monitoring system for a plurality of work stations comprising a set of register type production information sources for each work station, a set of preset production information sources for each work station, at least one set of preset employee information sources for each work station, means to assign certain of said work stations to a first group and other of said work stations to a second group, means for individually and successively selecting a set of register sources and sets of preset sources as work station set groupings of sources, said successive selections being made from sets in alternate groups, first and second memory means for said first and second groups respectively, means to couple said register type production information sources of a set for a selected work station group to said memory means of the group for said work station, means to read said registers into said memory means coupled thereto, means to record information stored in said memory means and said preset information sources, said recording means defining recording intervals, means to couple said memory means and said preset production information sources to said recording means during a recording interval for recording the information of said coupled sources and memory means, means to couple said memory means, said preset production information sources and a first set of said preset employee information sources to said recording means for a second recording interval to record the information in said memory and said information sources, means to couple said memory means, said preset production information sources and a second set of said preset employee information sources to said recording means for a third recording interval to record the information from said memory and sources and means to repetitively cycle said system through said first, second and third recording intervals for work station set groupings of alternate groups.

24. A combination according to claim 22 including verifying means to compare recorded information with a standard during each recording interval following the recording of said information, and means to couple said memory means and said preset information sources employed to record said information to said verifying means as said standard during the recording interval following the recording of said information.

25. A combination according to claim 24 including means to reset each memory means, and means to couple and actuate said reset means to said memory means subsequent to the verification by said verifying means of the last record to be produced from the information stored in said memory means.

26. A combination according to claim 24 including register reset means controlled by said memory means, and means to actuate said register reset means to reset said registers following the second recording interval in which the information from said memory means can be recorded.

27. A system for recording information comprising means defining clocking intervals, a recording means for recording discrete sets of information in each interval, a plurality of information sources in which information is accumulated, means grouping certain of said accumulating sources into sets of sources of a first and second group, memory means for each of said first and second groups, means for coupling said accumulating sources of each set of sources and the memory means for the group of said set, means for setting each memory means according to the information in the accumulating sources to which it is coupled, reset means for each accumulating source, reset means for each memory means, means responsive during a first clocking interval to actuate said coupling and setting means to set said first group memory means with information from a set of accumulating means of said first group, means responsive during a second clocking interval to record the information for said first group from said first group memory means, means responsive during said second clocking interval to actuate said coupling means and said reset means to reset said accumulating sources for a first grouping of sets of sources of a second group, means responsive during a third clocking interval to actuate said coupling means and said setting means to set said second group memory means with information from a second set of accumulating means of said second group, means responsive subsequent to the recording of the information for said first set of sources of said first group from said first group memory means for actuating said memory reset means for said first group memory, and means responsive during a fourth clocking interval to record the information for said second set of sources of said second group from said second memory means.

28. A system for recording information comprising means defining clocking intervals, a recording means for recording discrete sets of information in each interval, a plurality of information sources in which information is accumulated, means grouping certain of said accumulating sources into sets of sources of an odd and even group, memory means for each of said odd and even groups, means for selectively coupling said accumulating sources of each set of sources and the memory means for the group of said set, means for setting each memory means according to the information in the accumulating sources to which it is coupled, reset means for each accumulating source, reset means for each memory means, means responsive during a first clocking interval to actuate said coupling and setting means to set an odd group memory means with information from a set of accumulating means of said odd group, means responsive during a second clocking interval to record the information for said odd group from said odd group memory means, means responsive during said second clocking interval to actuate said coupling means and said reset means to reset said accumulating sources for a first set of sources of an even group, means responsive during a third clocking interval to record the information for said odd group from said odd group memory means, means responsive during said third clocking interval to actuate said coupling means and said setting means to set said even group memory means with information from a second set of accumulating means of said even group, means responsive subsequent to the final recording of the information for said first set of sources of said odd group from said first odd memory means for actuating said memory reset means for said odd group memory, and means responsive during a fourth clocking interval to record the information for said second set of sources of said even group from said even memory means.

29. A system for recording information comprising means defining clocking intervals, a recording means for recording discrete sets of information in each interval, a plurality of information sources in which information is accumulated, a plurality of information sources in which information is preset, means grouping certain of said accumulating sources and certain of said preset sources into sets of sources of a first and second group, memory means for each of said first and second groups, means for selecting individual sets of sources, said successive selections being made from sets in alternate groups, means for coupling said accumulating sources of each selected set of sources and the memory means for the group of said set, means for setting each memory means according to the information in the accumulating sources to which it is coupled, reset means for each accumulating source, reset means for each memory means, means responsive during a first clocking interval to actuate said selecting, coupling and setting means to set a first group memory means with information from a set of accumulating means of said first group, means responsive during a second clocking interval to record the information for said first group from said first group memory means and a first grouping of sets of the preset sources for said first group, means responsive during said second clocking interval to actuate said coupling means and said reset means to reset said accumulating sources for a first grouping of sets of sources of a second group, means responsive during a third clocking interval to record the information for said first group from said first group memory means and a second grouping of sets of preset sources for said first group, means responsive during said third clocking interval to actuate said selecting means, said coupling means and said setting means to set said second group memory means with information from a second set of accumulating means of said second group, means responsive subsequent to the final recording of the information for said first set of sources of said first group from said first group memory means for actuating said memory reset means for said first group memory, means responsive during a fourth clocking interval to record the information for said second set of sources of said second group from said second memory means and a grouping of sets of preset sources for said second set of sources of said second group, means repetitively cycling said system through succeeding clocking intervals comprising said first, second and third clocking intervals and means responsive to the selection of the final set of sources available to said selecting means to terminate operation of said system subsequent to the final recording of the information for said final set of sources.

30. A system for recording information comprising means defining clocking intervals, a recording means for recording discrete sets of information in each interval, a plurality of information sources in which information is accumulated, a plurality of information sources in which information is preset, means grouping certain of said accumulating sources and certain of said preset sources into sets of sources of a first and second group, memory means for each of said first and second groups, means for coupling said accumulating sources of each set of sources and the memory means for the group of said set, means for setting each memory means according to the information in the accumulating sources to which it is coupled, reset means for each accumulating source, reset means for each memory means, means responsive during a first clocking interval to actuate said coupling and setting means to set a first group memory means with information from a set of accumulating means of said first group, means responsive during a second clocking interval to record the information for said first group from said first group memory means and a first grouping of sets of the preset sources for said first group, means responsive during said second clocking interval to actuate said coupling means and said reset means to reset said accumulating sources for a first grouping of sets of sources of a second group, means responsive during a third clocking interval to record the information for said first group from said first group memory means and a second grouping of sets of preset sources for said first group, means responsive during said third clocking interval to actuate said coupling means and said setting means to set said second group memory means with information from a second set of accumulating means of said second group, means responsive subsequent to the final recording of the information for said first set of sources of said first group from said first group memory means for actuating said memory reset means for said first group memory, and means responsive during a fourth clocking interval to record the information for said second set of sources of said second group from said second memory means and a grouping of sets of preset sources for said second set of sources of said second group.

31. A system for recording information comprising a recording device having a recording interval and recording discrete sets of information in each interval, a plurality of information sources in which information is accumulated, a plurality of information sources in which information is preset, means grouping certain of said accumulating sources and certain of said preset sources into sets of sources of a first and second group, memory means for each of said first and second groups, means for coupling said accumulating sources of each set of sources and the memory means for the group of said set, means for setting each memory means according to the information in the accumulating sources to which it is coupled, reset means for each accumulating source, reset means for each memory means, means responsive during a first recording interval to actuate said coupling and setting means to set a first group memory means with information from a set of accumulating means of said first group, means responsive during a second recording interval to record the information for said first group from said first group memory means and a first grouping of sets of the preset sources for said first group, means responsive during said second recording interval to actuate said coupling means and said reset means to reset said accumulating sources for a first group of sources of a second group, means responsive during a third recording interval to record the information for said first group from said first group memory means and a second grouping of sets of preset sources for said first group, means responsive during said third recording interval to actuate said coupling means and said setting means to set said second group memory means with information from a second set of accumulating means of said second group, means responsive subsequent to the final recording of the information for said first set of sources of said first group from said first group memory means for actuating said memory reset means for said first group memory, and means responsive during a fourth recording interval to record the information for said second set of sources of said second group from said second memory means and a grouping of sets of preset sources for said second set of sources of said second group.

References Cited

UNITED STATES PATENTS

| | | | |
|---|---|---|---|
| 3,240,920 | 3/1966 | Barbagallo et al. | 235—153 |
| 3,275,987 | 9/1966 | Mann | 340—147 |

ROBERT C. BAILEY, *Primary Examiner.*

O. E. TODD, Jr., *Assistant Examiner.*